(12) United States Patent
Hashimoto et al.

(10) Patent No.: US 9,423,675 B2
(45) Date of Patent: Aug. 23, 2016

(54) PROJECTOR

(71) Applicant: Seiko Epson Corporation, Tokyo (JP)

(72) Inventors: Yoshinori Hashimoto, Shiojiri (JP); Hiroshi Tsuchitani, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 215 days.

(21) Appl. No.: 14/310,389

(22) Filed: Jun. 20, 2014

(65) Prior Publication Data

US 2015/0002826 A1 Jan. 1, 2015

(30) Foreign Application Priority Data

Jun. 26, 2013 (JP) .................................. 2013-133821

(51) Int. Cl.
*G03B 21/14* (2006.01)
*H04N 9/31* (2006.01)
*G03B 11/04* (2006.01)

(52) U.S. Cl.
CPC ............ *G03B 21/145* (2013.01); *G03B 11/043* (2013.01); *H04N 9/3141* (2013.01)

(58) Field of Classification Search
CPC .... G03B 21/145; G03B 21/14; G03B 11/043; G03B 11/04; G03B 11/048; H04N 9/3141
USPC ...................................... 353/88, 97; 396/448
See application file for complete search history.

(56) References Cited

U.S. PATENT DOCUMENTS

| 5,614,973 | A | * | 3/1997 | Azegami | ................ | G03B 17/04 396/448 |
| 2006/0268232 | A1 | | 11/2006 | Jin | | |
| 2011/0013279 | A1 | * | 1/2011 | Kang | ................... | G03B 11/041 359/511 |
| 2012/0236265 | A1 | * | 9/2012 | Watanabe | ............... | G03B 21/30 353/61 |

FOREIGN PATENT DOCUMENTS

| JP | 2010-262124 A | 11/2010 |
| KR | 2006-0122003 A | 11/2006 |

* cited by examiner

*Primary Examiner* — William C Dowling
*Assistant Examiner* — Ryan Howard
(74) *Attorney, Agent, or Firm* — ALG Intellectual Property, LLC

(57) ABSTRACT

A projector includes an armor housing including an opening section through which an image is transmitted and a shutter device configured to open and close the opening section. The shutter device includes a blade member, a moving section configured to move the blade member, and movement regulating sections configured to regulate the movement of the blade member. The blade member includes first blades and second blades arranged to overlap each other and configured to move in the same direction each other to close and open the opening section. The second blades are moved in the same direction as the first blades by frictional resistance with the first blades. The movement regulating sections include second-blade regulating sections configured to come into contact with the second blades moved in the closing direction to predetermined positions and regulate further movement of the second blades in the closing direction.

8 Claims, 14 Drawing Sheets

PROJECTOR

BACKGROUND

1. Technical Field

The present invention relates to a projector.

2. Related Art

There has been known a projector including a light source device, a light modulating device that modulates light emitted from the light source device and forms an image corresponding to image information, and a projection optical device that enlarges and projects the image on a projection surface such as a screen. As such a projector, there has been known a projector including a shutter that protects a projection optical device exposed to the outside (see, for example, JP-A-2010-262124 (Patent Literature 1).

The projector described in Patent Literature 1 includes an armor housing that houses the projection optical device (a projection lens) and the like on the inside. The armor housing includes an opening section that exposes the projection optical device and a tabular shutter that closes the opening section. The shutter is configured to be movable along a surface on which the opening section is formed in the armor housing. When the shutter is moved in one direction, the opening section is opened and the projection optical device is exposed. Consequently, an image can be projected on the projection surface. When the shutter is moved in the other direction, the opening section is closed. Therefore, the projection optical device can be protected.

However, for the shutter included in the projector described in Patent Literature 1, a space for retracting the tabular shutter needs to be provided in the armor housing. Therefore, the projector is increased in size.

SUMMARY

An advantage of some aspects of the invention is to provide a projector that can be reduced in size.

An aspect of the invention is directed to a projector including: an armor housing including an opening section through which an image is transmitted and configured to form an armor; and a shutter device configured to open and close the opening section. The shutter device includes: a blade member; a moving section configured to move the blade member in a closing direction in which the opening section is closed and an opening direction in which the opening section is opened; and a movement regulating section configured to come into contact with the blade member and regulate the movement of the blade member. The blade member includes a first blade and a second blade arranged to at least partially overlap each other and configured to move in the same direction each other to close and open at least apart of the opening section. When the first blade is moved by the moving section, the second blade is moved in the same direction as the first blade by frictional resistance with the first blade. The movement regulating section includes a second-blade regulating section configured to come into contact with the second blade moved in the closing direction to a predetermined position and regulate further movement of the second blade in the closing direction.

According to the aspect described above, the first blade and the second blade configured to open and close at least apart of the opening section are arranged to at least partially overlap each other. The second blade moves in the same direction as the first blade according to the movement of the first blade. Consequently, the first blade and the second blade can be arranged to overlap each other on the outer side of the opening section when the opening section is opened. Therefore, since a retraction space for the first blade and the second blade can be reduced, it is possible to reduce the projector in size.

When a plurality of the blade members overlapping each other are moved in the same direction each other, it is conceivable to provide in one blade member, a projecting section that projects to the other blade member side, provide, in the other blade member, an engaging section that engages with the projecting section, and move the other blade member according to the movement of the one blade member. However, in such a configuration, the projecting section and the engaging section need to be accurately provided such that the blade members are appropriately combined. Further, the blade members need to be accurately combined.

On the other hand, in the aspect described above, the second blade is moved in the same direction as the first blade by the frictional resistance with the first blade arranged to overlap the second blade. Consequently, it is unnecessary to separately provide the projecting section and the engaging section. Further, even if manufacturing accuracy and combination accuracy of the first blade and the second blade are relatively low, it is possible to move the second blade according to the movement of the first blade. Therefore, it is possible to simplify the configuration and the combination of the first blade and the second blade. Further, it is possible to easily manufacture the first blade and the second blade.

The second blade is moved in the same direction as the first blade by the frictional resistance with the first blade. The first blade and the second blade move in a state in which at least parts of the first blade and the second blade located in the opening section overlap each other. In this case, the retraction space can be reduced when the first blade and the second blade are arranged outside the opening section. However, when it is attempted to close at least a part of the opening section with the first blade and the second blade, the first blade and the second blade move in a state in which at least the parts thereof overlap each other. Therefore, the first blade and the second blade do not easily separate from each other. A region in the opening section closed by the blades decreases.

On the other hand, when the second blade, which moves in the closing direction together with the first blade, moves to the predetermined position, the further movement of the second blade in the closing direction is regulated by the second-blade regulating section. In this state, by further moving the first blade in the closing direction, it is possible to separate the first blade and the second blade. Therefore, it is possible to increase the region in the opening section closed by the blades.

When the first blade is moved in the opening direction in a state in which the first blade and the second blade are separated from each other, the first blade overlaps the second blade. A resistance value between the first blade and the second blade increases. When the resistance value exceeds a threshold, the second blade moves together with the first blade. Therefore, it is possible to surely move the second blade in the opening direction together with the first blade. Further, it is possible to locate the first blade and the second blade on the outer side of the opening section in a state in which the first blade and the second blade overlap each other.

In the aspect described above, it is preferable that the projector includes a blade urging member configured to urge the first blade and the second blade in directions in which one of the first blade and the second blade approaches the other.

According to this configuration, it is possible to surely bring the first blade and the second blade into contact with each other with an urging force of the blade urging member. Therefore, it is possible to surely move, with the frictional resistance with the first blade, the second blade in the same direction as the first blade according to the movement of the first blade.

In the aspect described above, it is preferable that the moving section includes a transmitting section configured to transmit a driving force for moving the first blade, and the transmitting section includes: a first gear section rotated by the transmitted driving force; a second gear section configured separately from the first gear section, arranged coaxially with the first gear section, and rotated in the same direction as the first gear section by the frictional resistance with the first gear section; and a gear urging member configured to urge the first gear section and the second gear section in directions in which the other approaches one of the first gear section and the second gear section.

When the further movement of the first blade is regulated in a state in which the first blade is moved in the closing direction and arranged in a position for closing the opening section and a state in which the first blade is moved in the opening direction and moved to a position for opening the opening section, a load is applied to the first blade when a driving force for further moving the first blade is transmitted to the first blade. In this case, when a driving section such as a motor that generates the driving force is provided as the moving section, a load is also applied to the driving section.

On the other hand, according to the configuration described above, when the driving force is transmitted to the first gear section in a state in which the movement of the first blade is regulated and the second gear section cannot rotate, even if the urging force by the gear urging member acts on the first gear section, it is possible to idle the first gear section, which is separate from the second gear section, with respect to the second gear section. Therefore, it is possible to suppress the driving force from being transmitted via the second gear section and suppress a load from being applied to the first blade and the driving section.

When the driving force is transmitted to the first gear section in a state in which the movement of the first blade is not regulated and the second gear section configured to transmit the driving force to the first blade is rotatable, it is possible to rotate the second gear section in the same direction with the frictional resistance with the first gear section according to the rotation of the first gear section. Therefore, it is possible to transmit the driving force via the second gear section. In this case, it is possible to surely bring the first gear section and the second gear section into contact with each other with the gear urging member. It is possible to surely rotate the second gear section according to the rotation of the first gear section.

In the aspect described above, it is preferable that the blade member includes a third blade and a fourth blade arranged to at least partially overlap each other and configured to turn in the same direction each other and close and open at least apart of the opening section, when the third blade is moved by the moving section, the fourth blade is moved in the same direction as the third blade by frictional resistance with the third blade, the first blade and the second blade open and close one region in the radial direction of the opening section, the third blade and the fourth blade open and close the other region in the radial direction of the opening section, and the first blade and the second blade and the third blade and the forth blade respectively move in directions in which the blades approach each other when closing the opening section and separate from each other when opening the opening section.

According to this configuration, the one region in the radial direction of the opening section is opened and closed by the first blade and the second blade and the other region is opened and closed by the third blade and the fourth blade. The first blade and the second blade and the third blade and the fourth blade respectively move in the directions in which the blades approach and separate from each other and close and open the opening section. Consequently, it is possible to reduce movement amounts of the blade compared with the case where the shutter device includes only the first blade and the second blade. Therefore, it is possible to reduce time involved in the opening and closing of the opening section and quickly open and close the opening section.

In the aspect described above, it is preferable that the moving section includes: a ring gear having an inner diameter larger than the inner diameter of the opening section, arranged along an end edge of the opening section, and rotated by a driving force transmitted thereto; a first-blade driving section configured to engage with the ring gear and move the first blade with the driving force transmitted from the ring gear; and a third-blade driving section configured to engage with the ring gear and move the third blade with the driving force transmitted from the ring gear.

According to this configuration, the first blade is moved by the first-blade driving section configured to engage with the ring gear arranged along the end edge of the opening section. The third blade is moved by the third-blade driving section configured to engage with the ring gear. Consequently, it is possible to move the first blade and the third blade in synchronization with each other. Therefore, it is possible to quickly and smoothly carry out the opening and closing of the opening section by the blades.

In the aspect described above, it is preferable that the moving section includes: a driving section configured to generate a driving force for moving the blade member; a transmission gear rotated by a driving force generated by the driving section and transmitted to the transmission gear and configured to transmit the driving force; and a gear supporting section configured to support the transmission gear, and the gear supporting section includes: a pin inserted through the transmission gear; an annular body through which the pin is inserted, the annular body being brought into contact with the transmission gear; and an annular-body urging member attached to the pin and configured to come into contact with the annular body and urge the annular body to the transmission gear side, and at least any one of the pin and the annular body includes a rotation regulating section configured to regulate the annular body from rotating together with the transmission gear.

Examples of the driving section include a motor in which a gear is provided in a rotating shaft. Examples of the annular-body urging member include a coil spring.

For the transmission gear to appropriately transmit the driving force, it is necessary to maintain, in an appropriate state, an engagement state (a meshing state) of the gear and other gears of the driving section and the transmission gear. Therefore, it is conceivable to maintain the engagement state by inserting the pin, which is inserted through the transmission gear, through the annular body, bringing the annular body into contact with the transmission gear, and urging the annular body to the transmission gear side with the annular-body urging member to prevent the position of the transmission gear from deviating. However, since the annular body is urged to the transmission gear, the annular body is sometimes rotated by the frictional resistance with the transmission gear according to the rotation of the transmission gear. When the annular body rotates in this way, it is likely that the annular-body urging member, which causes the urging force to act on the annular body, also rotates.

When the annular-body urging member is configured by a coil spring, the coil spring is not in surface contact with the annular body but is in contact with the annular body in a part thereof. Therefore, the coil spring is rotated in some cases and is not rotated in other cases. A load applied to the driving section fluctuates. In such a case, noise (humming sound) different from normal driving sound of the driving section is sometimes emitted.

On the other hand, according to the configuration described above, at least one of the annular body and the pin inserted through the annular body includes the rotation regulating section configured to regulate the annular body from rotating together with the transmission gear. Consequently, since the rotation of the annular body is regulated, it is possible to regulate the annular-body urging member from rotating together with the annular body. Therefore, it is possible to suppress the noise from being emitted.

In the aspect described above, it is preferable that the movement regulating section includes a first-blade regulating section configured to come into contact with the first blade that moves at least partially to the outer side of the opening section, and regulate the further movement of the first blade in the opening direction.

According to this configuration, it is possible to arrange, with the first blade regulating section, the first blade moving in the opening direction in a position to which the first blade is moved when the opening section is opened. In this case, as explained above, the second blade moves together with the first blade. Therefore, when the first blade is moved to the position, it is possible to locate at least a part of the second blade on the outer side of the opening section. Therefore, it is possible to surely open the opening section.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention is explained below with reference to the drawings.

External Configuration of a Projector

Figure 1:
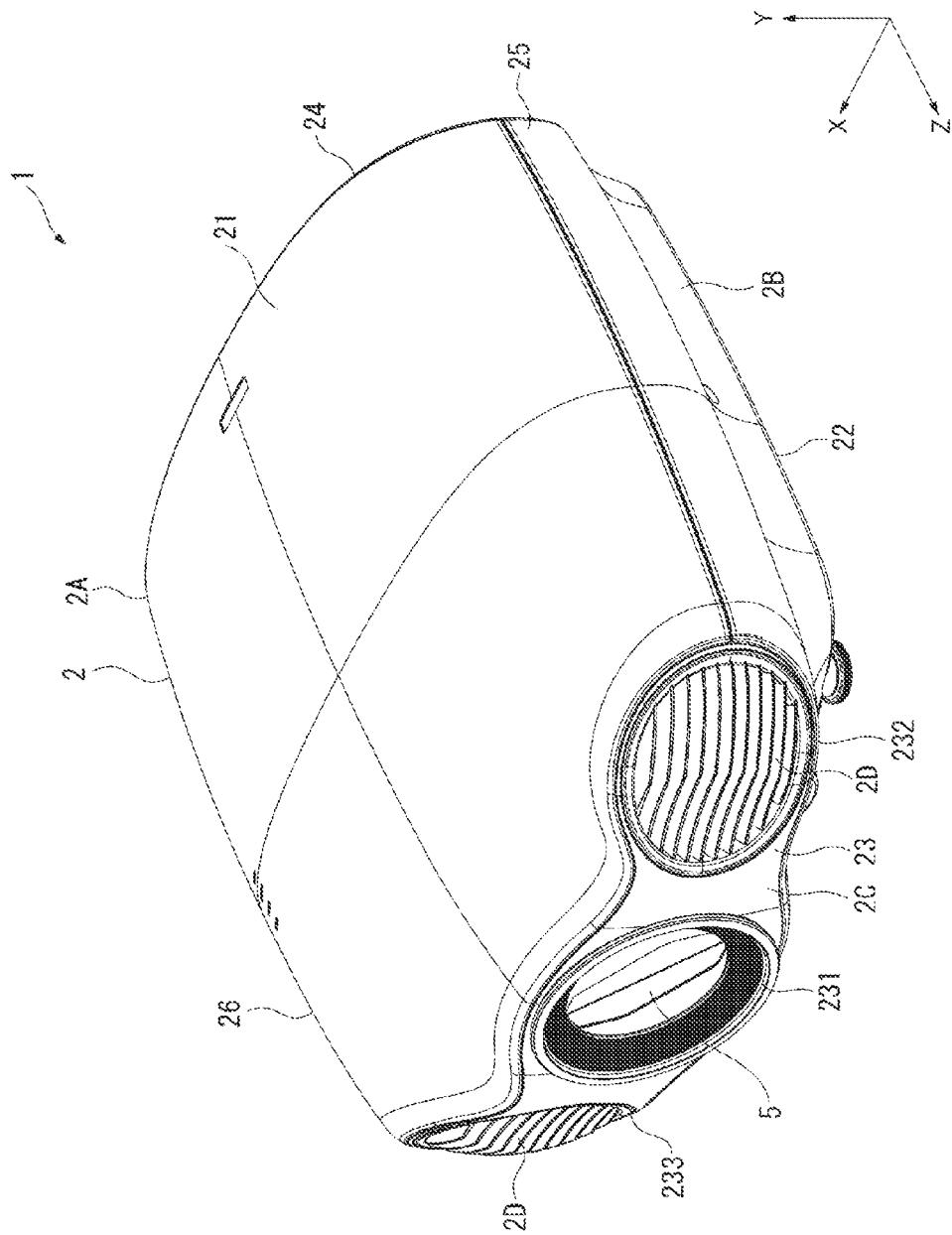
FIG. 1 is a perspective view of the projector according to an embodiment of the invention viewed from above on the front side.

FIG. 1 is a perspective view of a projector 1 according to this embodiment viewed from the front side.

The projector 1 according to this embodiment modulates light emitted from a light source device 41 (see FIG. 2) arranged on the inside, forms an image corresponding to image information, and enlarges and projects the image on a projection surface such as a screen. The projector 1 includes, as shown in FIG. 1, an armor housing 2 that configures an armor.

The armor housing 2 is a housing made of metal or synthetic resin. The armor housing 2 includes an upper case 2A, a lower case 2B, and a front case 2C. The upper case 2A configures an upper surface section 21 of the armor housing 2 and parts on the upper surface 21 side in a rear surface section 24, a right side surface section 25, and a left side surface section 26. The lower case 2B configures a lower surface section 22 and parts on the lower surface section 22 side in the rear surface section 24, the right side surface section 25, and the left side surface section 26. The front case 2C configures a front surface section 23. The cases 2A to 2C are fixed to one another by screws and the like.

In the following explanation and the figures referred to below, a projecting direction of an image by an optical unit 4 (a projection optical device 45) is represented as Z direction. Directions orthogonal to the Z direction and orthogonal to each other are represented as X direction and Y direction. Among the directions, the Y direction is a direction in which the projector 1 faces upward in a setting state in which the projector 1 is set on a horizontal plane (a direction from the lower surface section 22 to the upper surface section 21). The X direction is a direction from the right to the left of the projector 1 when viewed from the front side in the setting state (a direction from the right side surface section 25 to the left side surface section 26).

The front surface section 23 includes three opening sections 231 to 233 arranged in parallel to one another along the X direction.

The opening section 231 located in the center is an opening section for image passage for allowing an image emitted from the projection optical device 45 explained below to pass. On the inner surface side of the front surface section 23 (the opposite site of the Z direction), a shutter device 5 configured to open and close the opening section 231 is provided. The configuration of the shutter device 5 is explained in detail below.

The opening sections 232 and 233 formed on the left and the right of the opening section 231 are respectively exhaust ports for discharging the air circulated through the armor housing 2. Louver members 2D are attached to the opening sections 232 and 233.

Internal Configuration of the Projector

Figure 2:
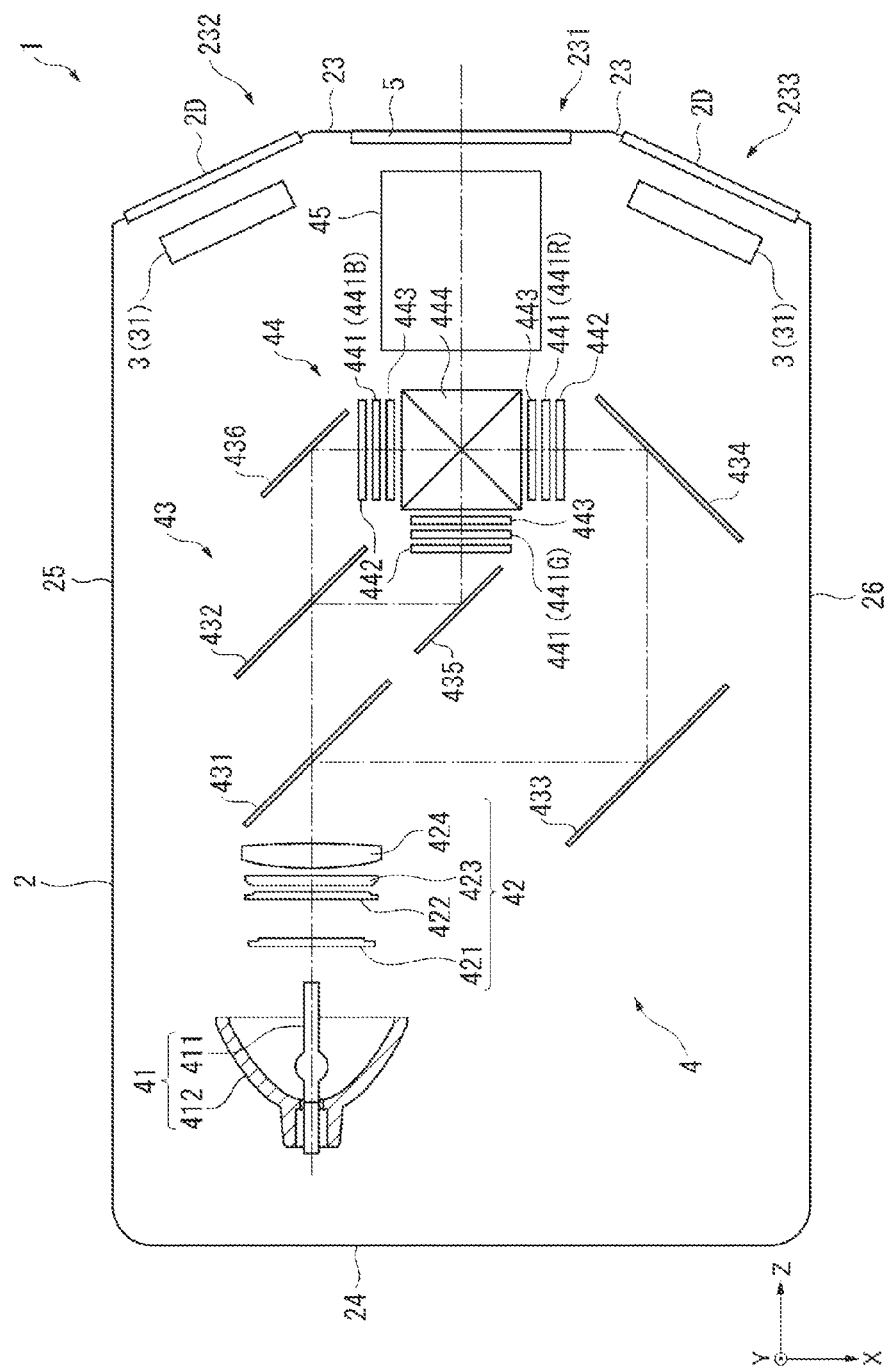
FIG. 2 is a diagram schematically showing the internal configuration of the projector in the embodiment.

FIG. 2 is a diagram schematically showing the internal configuration of the projector 1.

The projector 1 includes, besides the armor housing 2, as shown in FIG. 2, a cooling device 3 and the optical unit 4 housed in the armor housing 2. Although not shown in the figure, in the armor housing 2, a control device configured to control the projector 1 and a power supply device configured to supply electric power are arranged.

Configuration of the Cooling Device

The cooling device 3 circulates the air in the armor housing 2 and cools cooling targets included in the projector 1. The cooling device 3 includes a pair of fans 31 respectively arranged to be opposed to the opening sections 232 and 233. Although not shown in the figure, the cooling device 3 includes an intake fan configured to suck the external air via an intake port formed in a position on the rear surface side in the armor housing 2. The air sucked by the intake fan is sucked by the fans 31 after circulating through the armor housing 2 and discharged to the outside of the armor housing 2 via the opening sections 232 and 233.

Configuration of the Optical Unit

The optical unit 4 forms and projects an image corresponding to image information under the control by the control device. The optical unit 4 includes a light source device 41, an illumination optical device 42, a color separation optical device 43, an electric optical device 44, and the projection optical device 45.

The light source device 41 includes a light source lamp 411 and a reflector 412. Instead of the light source lamp 411, a solid-state light source such as an LED (Light Emitting Diode) or an LD (Laser Diode) may be adopted.

The illumination optical device 42 equalizes luminance in a plane orthogonal to the center axis of light emitted from the light source device 41. The illumination optical device 42 includes lens arrays 421 and 422, a polarization conversion element 423, and a superimposing lens 424.

The color separation optical device 43 separates red, green, and blue color lights from incident light. The color separation optical device 43 includes dichroic mirrors 431 and 432 and reflection mirrors 433 to 436.

The electric optical device 44 modulates incident light. The electric optical device 44 includes three incident side polarizing plates 442, three liquid crystal panels 441 (liquid crystal panels for red, green, and blue color lights are represented as 441R, 441G, and 441B) functioning as light modulating devices, three emission side polarizing plates 443, and cross dichroic prisms 444 functioning as color combination devices.

The projection optical device 45 projects, on the projection surface, color light combined by the cross dichroic prism 444 (i.e., an image formed by modulated color lights).

The red light separated by the color separation optical device 43 has a long optical path compared with the green light and the blue light. Therefore, a relay optical device including an incident side lens, a relay lens, and the like may be arranged on the optical path of the red light.

Configuration of the Shutter Device

Figure 3:
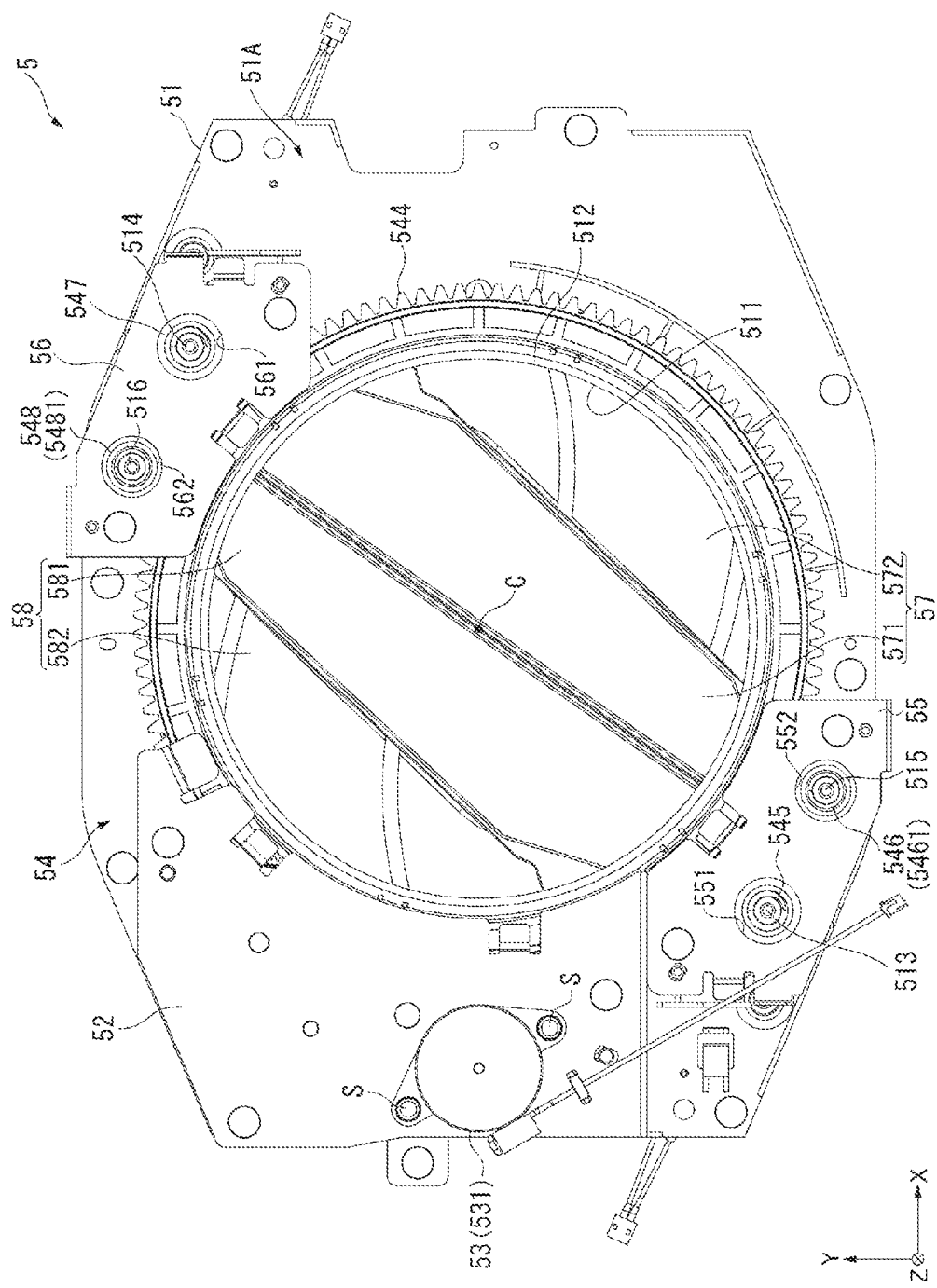
FIG. 3 is a diagram of a shutter device in a closed state in the embodiment viewed from a light incident side.
Figure 4:
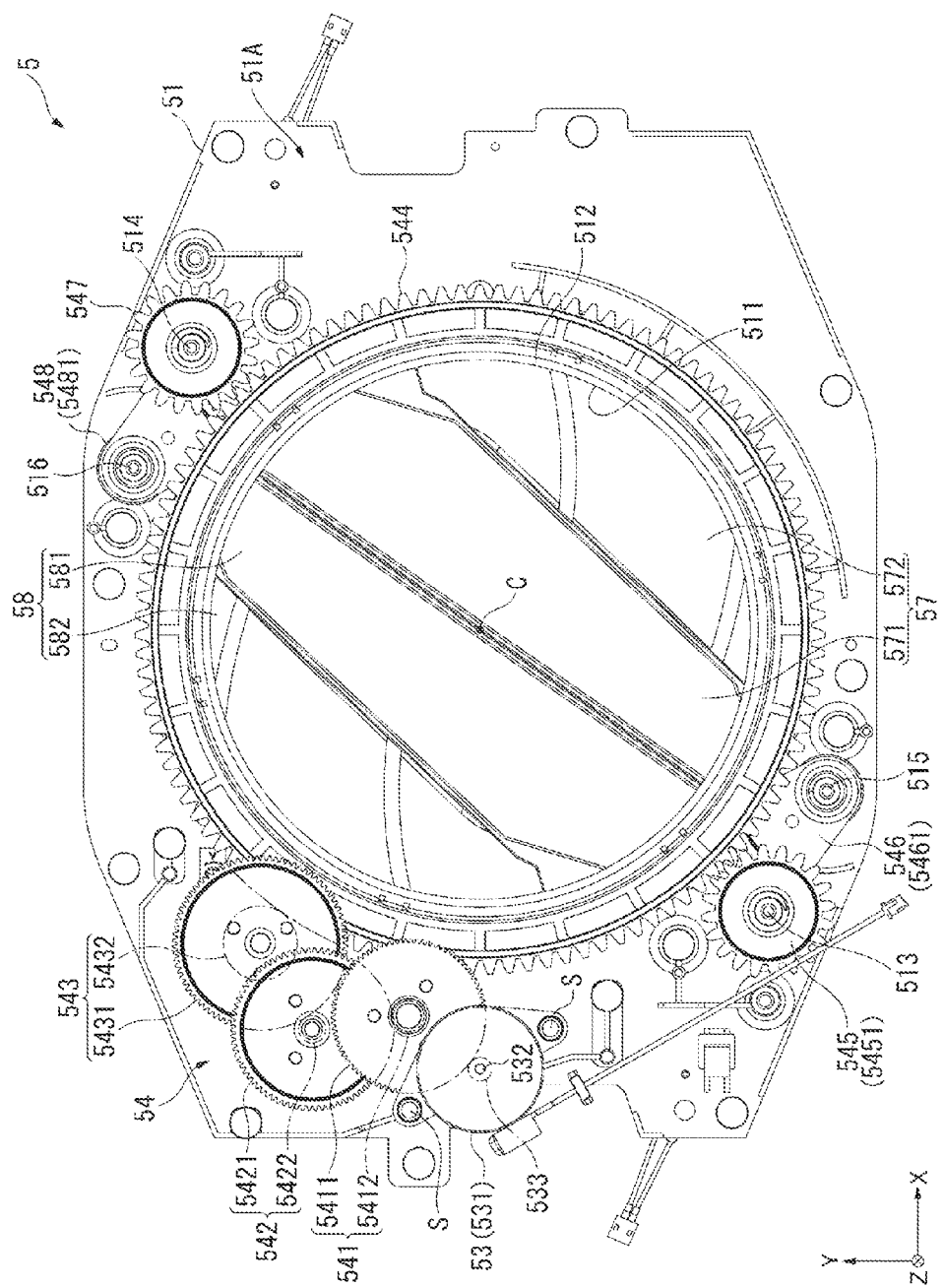
FIG. 4 is a diagram of the shutter device in the closed state in the embodiment viewed from the light incident side.
Figure 5:
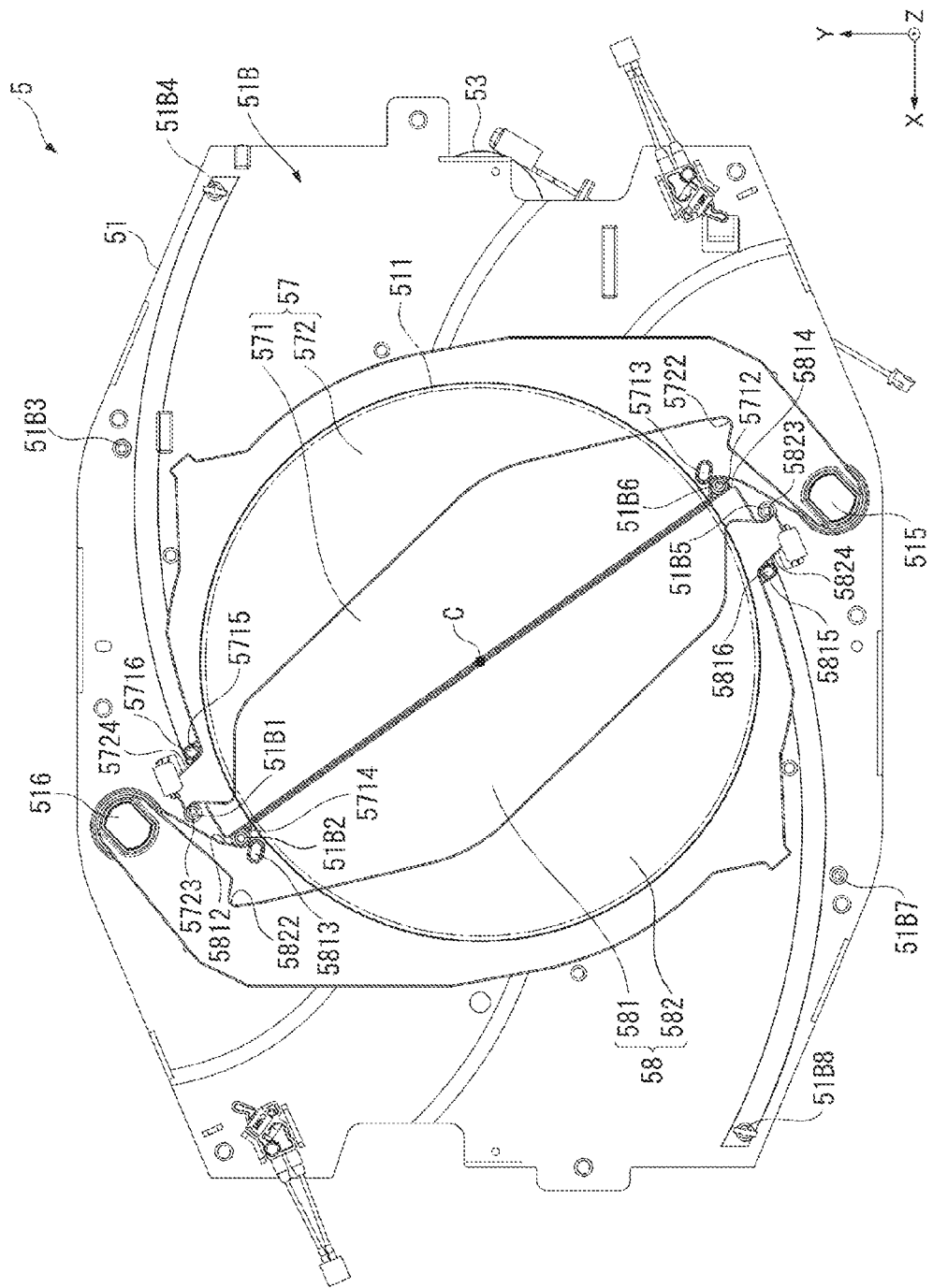
FIG. 5 is a diagram of the shutter device in the closed state in the embodiment viewed from a light emission side.
Figure 6:
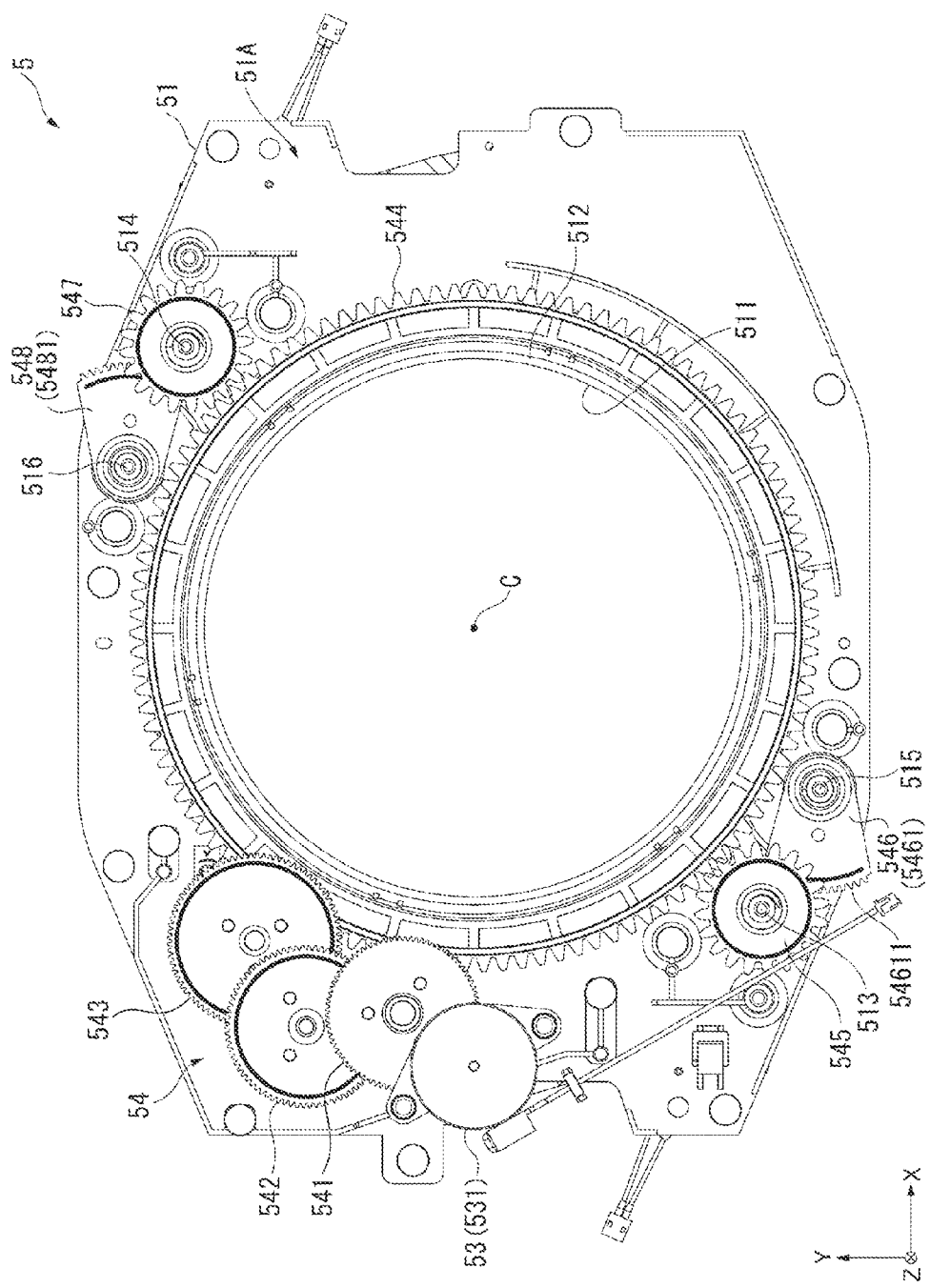
FIG. 6 is a diagram of the shutter device in an open state in the embodiment viewed from the light incident side.
Figure 7:
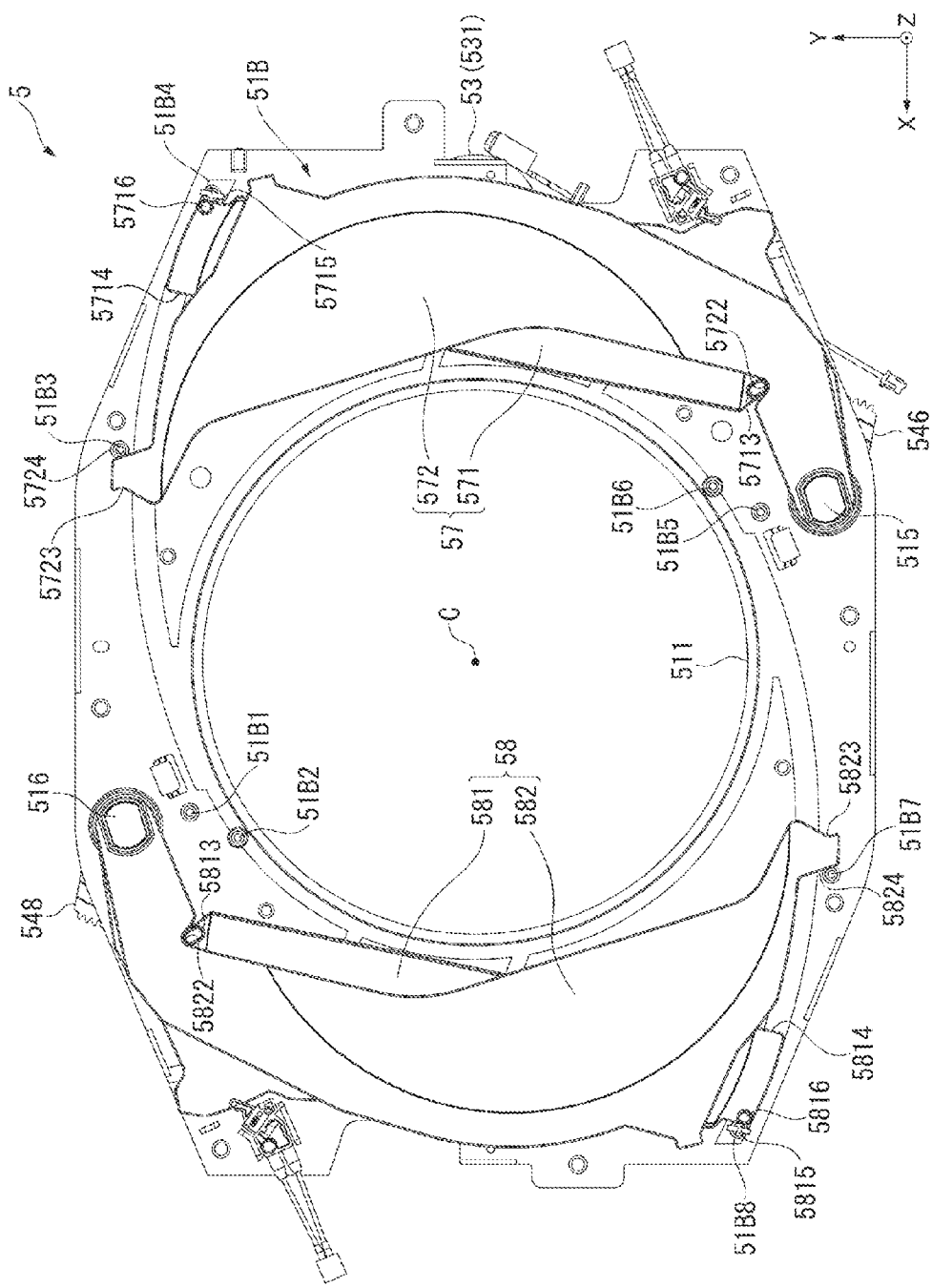
FIG. 7 is a diagram of the shutter device in the open state in the embodiment viewed from the light emission side.

FIGS. 3 and 4 are diagrams of the shutter device 5 in a closed state viewed from a light incident side. FIG. 5 is a diagram of the shutter device 5 in the closed state viewed from a light emission side. FIGS. 6 and 7 are diagrams of the shutter device 5 in an open state viewed from the light incident side and the light emission side. In FIGS. 4 and 6, a supporting member 52 and a cover member 55 are not shown.

The shutter device 5 is attached to the front surface section 23 on the inner side of the armor housing 2 and opens and closes the opening section 231. The shutter device 5 includes, as shown in FIGS. 3 to 7, a chassis 51, the supporting member 52 (FIG. 3), a driving section 53 (FIGS. 3, 4, and 6), a transmitting section 54 (FIGS. 4 and 6), two cover members 55 and 56 (FIG. 3), and two sets of shield blades 57 and 58 (FIGS. 3 to 5 and 7). Among these sections, the driving section 53 and the transmitting section 54 configure the moving section according to the invention.

Configuration of the Chassis

The chassis 51 is a tabular member attached to the inner surface of the front surface section 23 and is a member functioning as a base to which the components of the shutter device 5 are attached. The chassis 51 includes, as shown in FIGS. 3, 4, and 6, a circular opening section 511 formed in the substantially center position of the chassis 51, which is a position corresponding to the opening section 231, and a cylindrical section 512 projecting to the light incident side from an end edge of the opening section 511. A ring gear 544 included in the transmitting section 54 is rotatably attached to a surface 51A on the light incident side in the chassis 51 along the outer edge of the cylindrical section 512. As shown in FIG. 3, the supporting member 52, which supports the driving section 53, and the cover members 55 and 56 are attached to the chassis 51. The configurations of the supporting member 52 and the cover members 55 and 56 are explained in detail below.

Configuration of the Driving Section

The driving section 53 moves (turns) the two sets of shield blades 57 and 58 and generates a driving force for opening and closing the opening section 511 (and the opening section 231). As shown in FIG. 3, the driving section 53 is supported on the light incident side of the supporting member 52 attached to the surface 51A.

As shown in FIG. 4, the driving section 53 is configured by a motor 531 including a rotating shaft 532. A gear 533 is provided at an end of the rotating shaft 532. The gear 533 is inserted through a hole section 521 (see FIGS. 12 and 13) formed in the supporting member 52 and exposed to the light emission side of the supporting member 52, that is, the light incident side of the chassis 51.

Driving of the motor 531 is controlled by the control device. When the motor 531 is driven, the gear 533 rotates.

Configuration of the Transmitting Section

The transmitting section 54 transmits a driving force (a rotating force) of the gear 533 and moves the shield blades 57 and 58. The transmitting section 54 includes gears 541 to 543 (FIGS. 4 and 6), the ring gear 544 (FIGS. 3, 4, and 6), transmission adjusting sections 545 and 547 (FIGS. 4 and 6), and blade driving sections 546 and 548 (FIGS. 4 and 6).

The gears 541 to 543 are rotatably supported by the supporting member 52. When the supporting member 52 is fixed to the chassis 51, the gears 541 to 543 are arranged to be opposed to the surface 51A.

As shown in FIG. 4, the gears 541 to 543 are respectively configured by two-stage gears and respectively include small-diameter gear sections and large-diameter gear sections. The gears 541 to 543 are arranged such that the small-diameter gear sections are located on the chassis 51 side and the large-diameter gear sections are located on the supporting member 52 side.

Specifically, a large-diameter section 5411 of the gear 541 meshes with the gear 533. A small-diameter gear section 5412 of the gear 541 meshes with a large-diameter gear section 5421 of the gear 542. A small-diameter gear section 5422 of the gear 542 meshes with a large-diameter gear section 5431 of the gear 543. A small-diameter gear section 5432 of the gear 543 meshes with the ring gear 544. The rotation of the gear 533 is decelerated and transmitted to the ring gear 544 by the gears 541 to 543.

In the supporting member 52, a supporting structure (a gear supporting section 522 explained below) configured to suppress emission of noise involved in the rotation of the gear 541 is provided. The supporting structure is explained in detail below.

As shown in FIGS. 3, 4, and 6, the ring gear 544 is attached to the outer side of the cylindrical section 512 along the circumferential edge of the opening section 511 to be rotatable about a center position C of the opening section 511. That is, the ring gear 544 has an inner diameter larger than the inner diameter of the opening section 511. A plurality of teeth, which mesh with the gear 543, and the transmission adjusting sections 545 and 547 are formed on the outer circumferential surface of the ring gear 544. The ring gear 544 rotates according to the rotation of the gear 543 and transmits a driving force, which is transmitted from the gear 543, to the transmission adjusting sections 545 and 547.

The transmission adjusting sections 545 and 547 are arranged in symmetrical positions each other across the center position C of the opening section 511. When the shield blades 57 and 58 are turnable, the transmission adjusting sections 545 and 547 transmit a driving force, which is transmitted from the ring gear 544, to the blade driving sections 546 and 548. When the shield blades 57 and 58 are not turnable, the transmission adjusting sections 545 and 547 do not transmit the driving force to the blade driving sections 546 and 548. The configuration of the transmission adjusting sections 545 and 547 is explained in detail below.

Like the transmission adjusting sections 545 and 547, the blade driving sections 546 and 548 are arranged in symmetrical positions each other across the center position C. The blade driving section 546 turns the shield blade 57 with the driving force transmitted from the transmission adjusting section 545. The blade driving section 548 turns the shield blade 58 with the driving force transmitted from the transmission adjusting section 547. The configuration of the blade driving section 546 and 548 is explained in detail below.

Configuration of the Cover Members

The cover members 55 and 56 are respectively tabular members made of metal. As shown in FIG. 3, the cover members 55 and 56 are respectively screwed to pins (not shown in the figure) protrudingly provided on the surface 51A of the chassis 51.

The cover member 55 is provided on the surface 51A to cover and protect the transmission adjusting section 545 and the blade driving section 546. The cover member 55 includes two hole sections 551 and 552 through which a pin-like section 513 and a pin 515 are inserted.

Similarly, the cover member 56 is provided on the surface 51A to cover and protect the transmission adjusting section 547 and the blade driving section 548. The cover member 56 includes two hole sections 561 and 562 through which a pin-like section 514 and a pin 516 are inserted.

Configuration of the Shield Blades

As shown in FIGS. 5 and 7, the two sets of shield blades 57 and 58 are arranged on a surface 51B on the opposite side of the surface 51A in the chassis 51 (the surface 51B on the light emission side). The shield blades 57 and 58 are supported in symmetrical positions across the center position C of the opening section 511 by the pins 515 and 516 to be turnable about the pins 515 and 516. The shield blades 57 and 58 turn in directions separating from each other according to the turning of the blade driving sections 546 and 548 to open the opening section 511 and turn in directions approaching each other to close the opening section 511. Consequently, the opening section 231 corresponding to the opening section 511 is opened and closed.

The shield blade 57 includes two blade members. The shield blade 57 mainly opens and closes a region on the opposite side of the X direction with respect to the center position C in a region in the opening section 511. The shield blade 57 includes an inner blade 571, which is a blade member located on the center position C side of the opening section 511 when the opening section 511 is closed, and an outer blade 572, which is a blade member located further on the outer side than the inner blade 571.

The inner blade 571 is equivalent to the first blade and the third blade according to the invention. The outer blade 572 is equivalent to the second blade or the fourth blade according to the invention. The inner blade 571 and the outer blade 572 are attached along the surface 51B to be turnable about the turning axis of the blade driving section 546 (i.e., about the pin 515) in a state in which the pin 515 is inserted through the inner blade 571 and the outer blade 572. In this case, the inner blade 571 is arranged on the surface 51B side with respect to the outer blade 572.

The inner blade 571 and the outer blade 572 are pressed and urged in directions approaching each other. As specifically explained below, in this embodiment, the inner blade 571 and the outer blade 572 are set in contact with each other in a state in which the inner blade 571 is urged in a direction approaching the outer blade 572. A driving gear 5461 included in the blade driving section 546 and having a turning axis same as the turning axis of the blades 571 and 572 is pressed and urged by the inner blade 571. Therefore, when the inner blade 571 turns in the same direction according to the turning of the driving gear 5461, which meshes with the transmission adjusting section 545, the outer blade 572 is turned in the same direction together with the inner blade 571 by frictional resistance with the inner blade 571.

The inner blade 571 is a thin tabular member made of synthetic resin formed in an arcuate shape.

A hole section 5711 (see FIG. 9), into which the pin 515 is inserted, is formed on one end side of the inner blade 571. A recess 5712 is formed in a part on the one end side and in a position corresponding to the end edge of the opening section 511 when the inner blade 571 closes the opening section 511. A protrusion 5713 projecting to the light emission side (the Z direction side) is provided near the recess 5712.

On the other hand, a first contact section 5714, which comes into contact with a movement regulating section 51B2 explained below, is arranged on the other end side of the inner blade 571 and at the end on the shield blade 58 side. A second contact section 5715, which comes into contact with a movement regulating section 51B4 explained below, is arranged on the other end side and at the end on the opposite side of the shield blade 58. Further, a protrusion 5716 projecting to the light emission side is provided near the second contact section 5715.

Like the inner blade 571, the outer blade 572 is a thin tabular member made of synthetic resin formed in an arcuate shape. A hole section 5721 (see FIG. 9), into which the pin 515 is inserted, is formed on one end side of the outer blade 572. A recess 5722 recessed to the opposite side of the inner blade 571 side is formed on the one end side.

On the other hand, a first contact section 5723, which comes into contact with the movement regulating section 51B1, is arranged on the other end side of the outer blade 572 and at the end on the shield blade 58 side. A second contact section 5724, which comes into contact with a movement regulating section 51B3 explained below, is arranged on the other end side and at the end on the opposite side of the shield blade 58 side.

The shield blade 58 mainly opens and closes a region on the X direction side with respect to the center position C in the region in the opening section 511. The shield blade 58 includes an inner blade 581 having substantially the same shape as the inner blade 571 and an outer blade 582 having substantially the same shape as the outer blade 572.

The inner blade 581 is equivalent to the third blade or the first blade according to the invention. The outer blade 582 is equivalent to the fourth blade or the second blade according to the invention. Like the inner blade 571, the inner blade 581 includes a hole section (not shown in the figure), a recess 5812, protrusions 5813 and 5816, a first contact section 5814, and a second contact section 5815. Like the outer blade 572, the outer blade 582 includes a hole section (not shown in the figure), a recess 5822, a first contact section 5823, and a second contact section 5824.

On the surface 51B of the chassis 51, as shown in FIGS. 5 and 7, movement regulating sections 51B1 to 51B4 configured to come into contact with the shield blade 57 and regulate movement (turning) of the shield blade 57 and movement regulating sections 51B5 to 51B8 configured to come into contact with the shield blade 58 and regulate movement (turning) of the shield blade 58 are provided. In this embodiment, the movement regulating sections 51B1 to 51B8 are configured as protrusions projecting from the surface 51B.

Specifically, the movement regulating sections 51B1 and 51B2 are provided near the end edge of the opening section 511 and in a position on the opposite side of the arrangement position of the pin 515 with respect to the center position C.

The movement regulating section 51B1 is equivalent to the second blade regulating section according to the invention. As shown in FIG. 5, the first contact section 5723 comes into contact with the movement regulating section 51B1 when the outer blade 572 turned in a closing direction (a direction in which the blades 571 and 572 move to the center position C side) together with the inner blade 571 reaches a closing position set in advance.

As shown in FIG. 5, the first contact section 5714 comes into contact with the movement regulating section 51B2 when the inner blade 571 turned in the closing direction reaches a closing position set in advance.

Further turning of the blades 571 and 572 in the closing direction from the closing positions is regulated by the movement regulating sections 51B1 and 51B2. The closing positions of the blades 571 and 572 are positions where the region on the opposite side of the X direction with respect to the center position C in the region in the opening section 511 is completely closed by the blades 571 and 572.

The movement regulating sections 51B3 and 51B4 are provided near the circumferential edge of the surface 51B.

As shown in FIG. 7, the second contact section 5724 comes into contact with the movement regulating section 51B3 when the outer blade 572 turned in an opening direction (a direction in which the blades 571 and 572 move to the outer side of the opening section 511) together with the inner blade 571 reaches an opening position set in advance.

The movement regulating section 51B4 is equivalent to the first blade regulating section according to the invention. As shown in FIG. 7, the second contact section 5715 comes into contact with the movement regulating section 51B4 when the inner blade 571 turned in the opening direction reaches an opening position set in advance.

Further turning of the blades 571 and 572 in the opening direction from the opening positions is regulated by the movement regulating sections 51B3 and 51B4. The opening positions of the blades 571 and 572 are positions where the blades 571 and 572 are located when the entire blades 571 and 572 are located on the outer side of the opening section 511.

Moving ranges (ranges from the closing positions to the opening positions) of the inner blade 571 and the outer blade 572 are regulated by the movement regulating sections 51B1 to 51B4.

The movement regulating sections 51B5 and 51B6 are provided in positions near the end edge of the opening section 511 and on the opposite side of the arrangement position of the pin 516 with respect to the center position C.

The movement regulating section 51B5 is equivalent to the second blade regulating section according to the invention. As shown in FIG. 5, the first contact section 5823 comes into contact with the movement regulating section 51B5 when the outer blade 582 reaches a closing position set in advance.

The first contact section 5814 comes into contact with the movement regulating section 51B6 when the inner blade 581 reaches a closing position set in advance.

Further turning of the blades 581 and 582 in a closing direction (a direction in which the blades 581 and 582 move to the center position C) from the closing positions is regulated by the movement regulating sections 51B5 and 51B6. The closing positions of the blades 581 and 582 are positions where the blades 581 and 582 are located when the region on the X direction side with respect to the center position C in the region in the opening section 511 is completely closed by the blades 581 and 582.

The movement regulating sections 51B7 and 51B8 are respectively provided on the opposite side of the formation positions of the movement regulating sections 51B3 and 51B4 with respect to the center position C near the circumferential edge of the surface 51B.

The second contact section 5824 comes into contact with the movement regulating section 51B7 when the outer blade 582 reaches an opening position set in advance.

The movement regulating section 51B8 is equivalent to the first blade regulating section according to the invention. The second contact section 5815 comes into contact with the movement regulating section 51B8 when the inner blade 581 reaches an opening position set in advance.

Further turning of the blades 581 and 582 in an opening direction (a direction in which the blades 581 and 582 move to the outer side of the opening section 511) from the opening positions is regulated by the movement regulating sections 51B7 and 51B8. As explained above, the opening positions of the blades 581 and 582 are positions where the blades 581 and 582 are located when the entire blades 581 and 582 are located on the outer side of the opening section 511.

Moving ranges (ranges from the closing positions to the opening positions) of the inner blade 581 and the outer blade 582 are regulated by the movement regulating sections 51B5 to 51B8.

Configuration of the Transmission Adjusting Section

Figure 8:
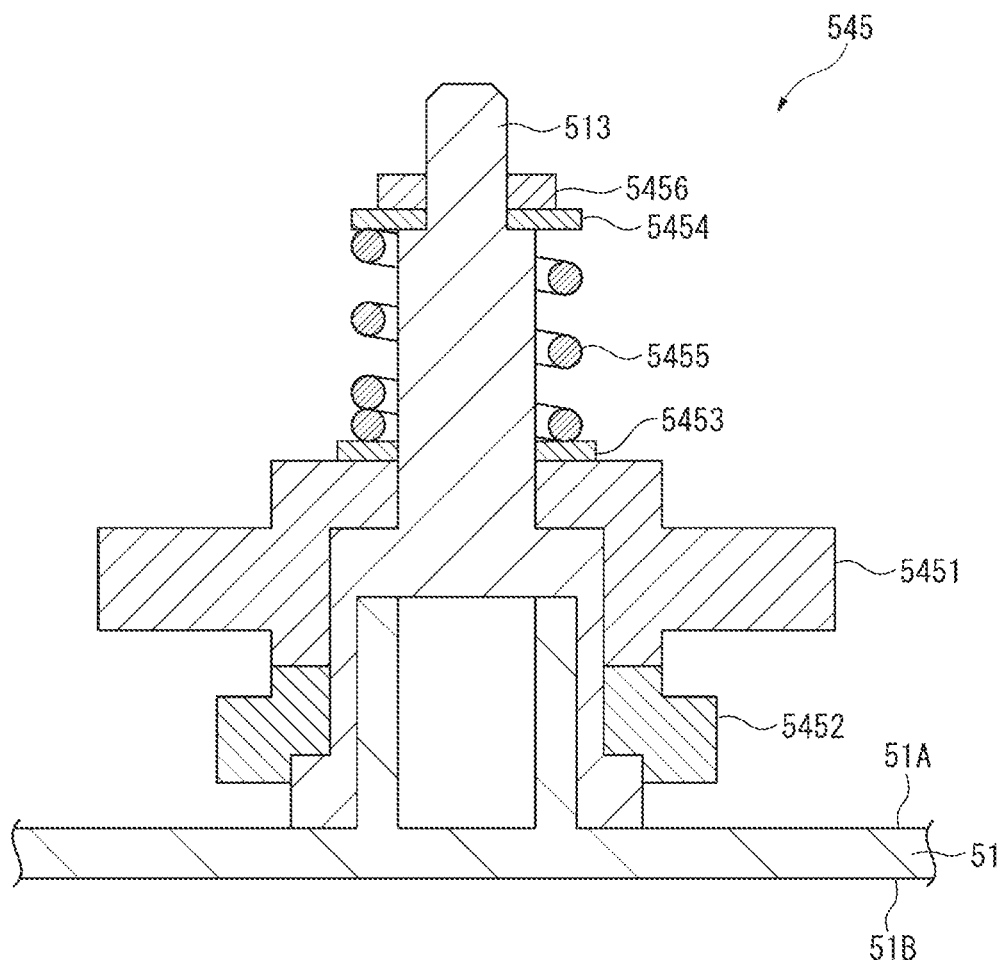
FIG. 8 is a sectional view showing a transmission adjusting section in the embodiment.

FIG. 8 is a sectional view showing the transmission adjusting section 545.

The transmission adjusting section 545 configures the first blade driving section and the third blade driving section according to the invention in conjunction with the blade driving section 546. As explained above, the transmission adjusting section 545 transmits a rotating force of the ring gear 544 to the blade driving section 546. The transmission adjusting section 545 includes, as shown in FIG. 8, a first gear section 5451 and a second gear section 5452 configured as separate bodies, washers 5453 and 5454, an urging member 5455, and a locking member 5456.

The pin-like section 513 provided in the chassis 51 is inserted through the first gear section 5451, the second gear section 5452, the washers 5453 and 5454, and the urging member 5455 among these sections. The locking member

5456 is attached to the pin-like section 513. That is, the pin-like section 513 is attached to the second gear section 5452, the first gear section 5451, the washer 5453, the urging member 5455, the washer 5454, and the locking member 5456 in this order from the surface 51A side of the chassis 51.

The first gear section 5451 and the second gear section 5452 are respectively cylindrical gears and rotatably supported by the pin-like section 513. The first gear section 5451 meshes with the ring gear 544. The second gear section 5452 is a gear having a diameter smaller than the diameter of the first gear section 5451 and meshes with the driving gear 5461 explained below of the blade driving section 546.

The urging member 5455 is equivalent to the gear urging member according to the invention. The urging member 5455 causes an urging force to act on the washer 5453 side. The first gear section 5451 pressed by the washer 5453 is urged in a direction approaching the second gear section 5452. Therefore, when the first gear section 5451, which meshes with the ring gear 544, is rotated, the second gear section 5452 in contact with the first gear section 5451 is rotated in the same direction as the first gear section 5451 by frictional resistance.

Although not shown in the figure in detail, the transmission adjusting section 547 includes the same configuration as the transmission adjusting section 545.

When the shield blade 57 is located in the closing position, the turning of the shield blade 57 in the closing direction is regulated by the movement regulating sections 51B1 and 51B2. Similarly, when the shield blade 57 is located in the opening position, the turning of the shield blade 57 in the opening direction is regulated by the movement regulating sections 51B3 and 51B4.

In these cases, when a driving force for turning the shield blade 57 in the direction in which the turning is regulated is transmitted to the blade driving section 546, a load is applied to the shield blade 57 and a load is applied to the motor 531. This problem also occurs in the shield blade and the blade driving section 548 having the same configuration.

On the other hand, in a state in which the turning of the shield blade 57 is regulated, the second gear section 5452, which meshes with the blade driving section 546, is kept stopped. Only the gear section 5451 separate from the second gear section 5452 is rotated by a driving force transmitted from the ring gear 544. That is, the first gear section 5451 idles.

Therefore, since the driving force is not transmitted to the blade driving section 546 via the second gear section 5452, it is possible to suppress a load from being applied to the shield blade 57 and the motor 531.

An urging force by the urging member 5455 is set to a value for idling the first gear section 5451 in a state in which the turning of the shield blade 57 is regulated. The urging force is set to a value for enabling both of the first gear section 5451 and the second gear section 5452 to rotate in a state in which the turning of the shield blade 57 is not regulated.

Further, the transmission adjusting section 547 including the first gear section, which meshes with the ring gear 544, and the second gear section, which meshes with the blade driving section 548, includes the same configuration as the transmission adjusting section 545. Therefore, the transmission adjusting section 547 attains the same action. The transmission adjusting section 547 configures the third blade driving section or the first blade driving section according to the invention in conjunction with the blade driving section 548.

Configuration of the Blade Driving Section

Figure 9:
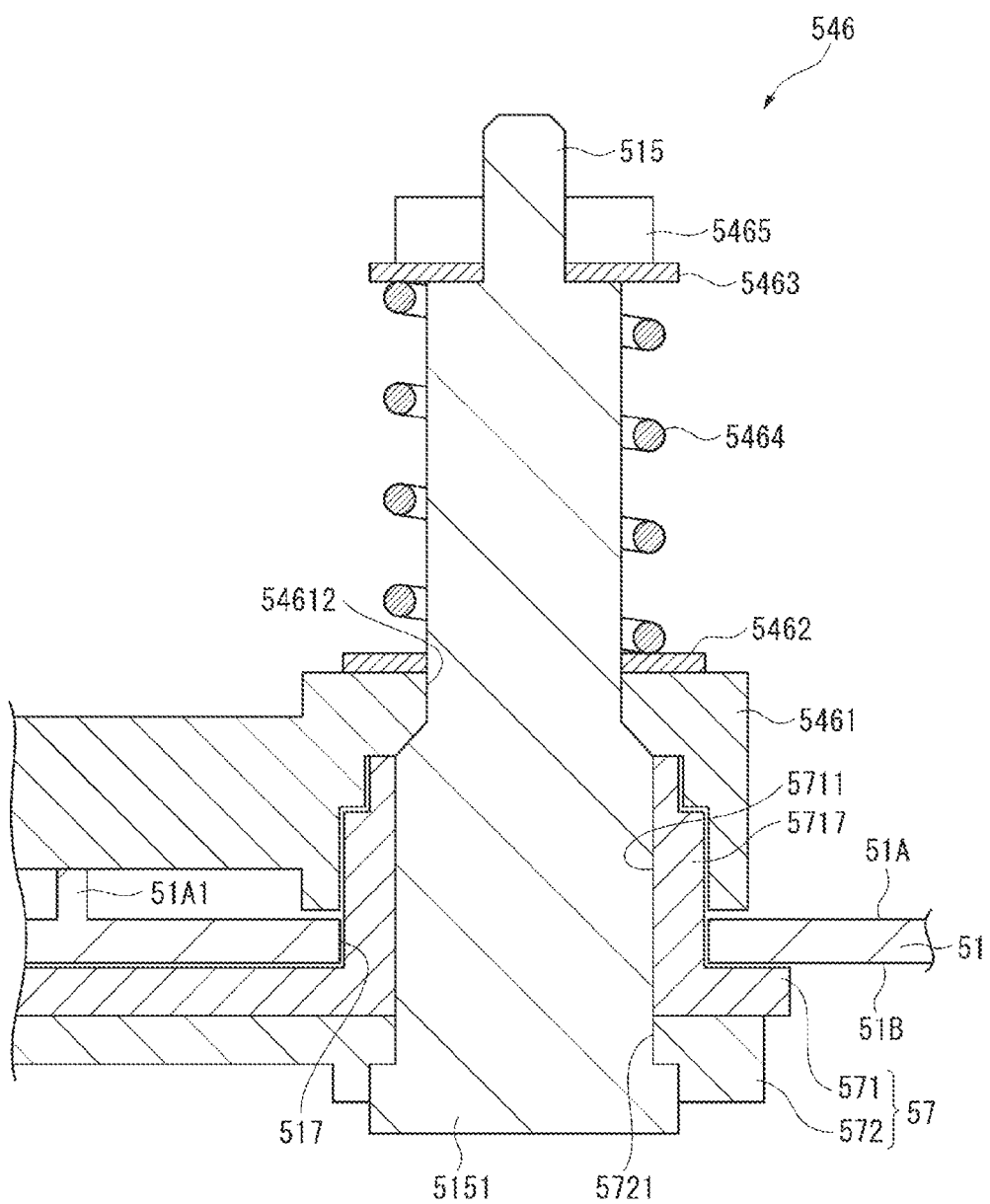
FIG. 9 is a sectional view showing a blade driving section in the embodiment.

FIG. 9 is a sectional view showing the blade driving section 546.

As explained above, the blade driving section 546 turns the inner blade 571 and the outer blade 572 included in the shield blade 57 with the driving force transmitted from the transmission adjusting section 545. The blade driving section 546 includes, as shown in FIG. 9, the driving gear 5461, two washers 5462 and 5463, an urging member 5464, and a locking member 5465. Theses sections are attached to the chassis 51 by the pin 515 inserted through a through-hole 517 formed in the chassis 51.

As shown in FIG. 6, the driving gear 5461 is a fan-shaped gear arranged on the light incident side (the surface 51A side) of the chassis 51. In an arcuate section 54611 in the driving gear 5461, a plurality of teeth, which mesh with the second gear section 5452, are formed. In a position corresponding to the center of the arc of the arcuate section 54611 in the driving gear 5461, as shown in FIG. 9, a hole section 54612 through which the pin 515, which pierces through the chassis 51, is inserted is formed.

A boss 5717 projecting along the circumferential edge of the hole section 5711 in the inner blade 571 arranged on the surface 51B side is inserted into the hole section 54612. That is, in the hole section 54612, the driving gear 5461 and the inner blade 571 come into contact with each other along an inserting direction of the pin 515 inserted through the driving gear 5461 and the inner blade 571 (i.e., the Z direction).

A rib 51A1 protrudingly provided on the surface 51A is brought into contact with a surface on the surface 51A side of the driving gear 5461. Consequently, inclination of the driving gear 5461 is suppressed.

The washers 5462 and 5463 are located on the opposite side of the inner blade 571 with respect to the driving gear 5461. The pin 515 is inserted through the washers 5462 and 5463.

The urging member 5464 is equivalent to the blade urging member according to the invention. The urging member 5464 is arranged in a position between the washers 5462 and 5463. In this embodiment, the urging member 5464 is configured by a compression coil spring.

The locking member 5465 is fixed to the pin 515 like the locking member 5456 and locks the washer 5463.

In the blade driving section 546, extension of the urging member 5464 to the washer 5463 side is regulated by the washer 5463 locked by the locking member 5465. Therefore, the urging member 5464 causes an urging force to act on the washer 5462 side. The driving gear 5461 pressed by the washer 5462 is urged in a direction approaching the inner blade 571.

The pin 515 includes a pressing section 5151 extending further to the outer side than the inner diameter of the hole section 5721 of the outer blade 572, through which the pin 515 is inserted, and configured to press the outer blade 572 from the opposite side of the inner blade 571 side with respect to the outer blade 572. Therefore, the outer blade 572, the inner blade 571, the driving gear 5461, and the washer 5462 arranged between the pressing section 5151 and the urging member 5464 are urged to the pressing section 5151 side by the urging member 5464. Consequently, the outer blade 572, the inner blade 571, and the driving gear 5461 come into close contact with one another. Therefore, the inner blade 571 is turned in the same direction as the driving gear 5461 by frictional resistance with the driving gear 5461. The outer blade 572 is turned in the same direction as the inner blade 571 by frictional resistance with the inner blade 571.

Like the relation between the first gear section 5451 and the second gear section 5452 in the transmission adjusting section 545, in a state in which the outer blade 572 reaches the closing position or the opening position, when the driving gear 5461 is further turned in the direction in which the turning of the outer blade 572 is regulated, only the driving gear 5461 and the inner blade 571 turn. Therefore, it is possible to turn the inner blade 571 and locate the inner blade 571 in the closing position while maintaining a state in which the outer blade 572 is located in the closing position. Similarly, it is possible to turn the inner blade 571 and locate the inner blade 571 in the opening position while maintaining a state in which the outer blade 572 is located in the opening position.

Although not shown in the figure in detail, like the blade driving section 546, the blade driving section 548 includes a driving gear 5481 (see FIGS. 4 and 6), which meshes with the second gear section of the transmission adjusting section 547, two washers, a compression spring, and a locking member. The blade driving section 548 functions in the same manner as the blade driving section 546.

Operation of the Shield Blades

In a state in which the opening section 511 is opened, as shown in FIG. 7, the inner blades 571 and 581 are located in the opening positions where the second contact sections 5715 and 5815 come into contact with the movement regulating sections 51B4 and 51B8. The outer blades 572 and 582 are located in the opening positions where the second contact sections 5724 and 5824 come into contact with the movement regulating sections 51B3 and 51B7.

In this state, when the motor 531 of the driving section 53 is driven and the gear 533 rotates in a direction for turning the shield blades 57 and 58 in the closing direction, a driving force by the driving section 53 (a rotating force of the gear 533) is transmitted to the transmission adjusting sections 545 and 547 via the gears 541 to 543 and the ring gear 544.

Figure 10:
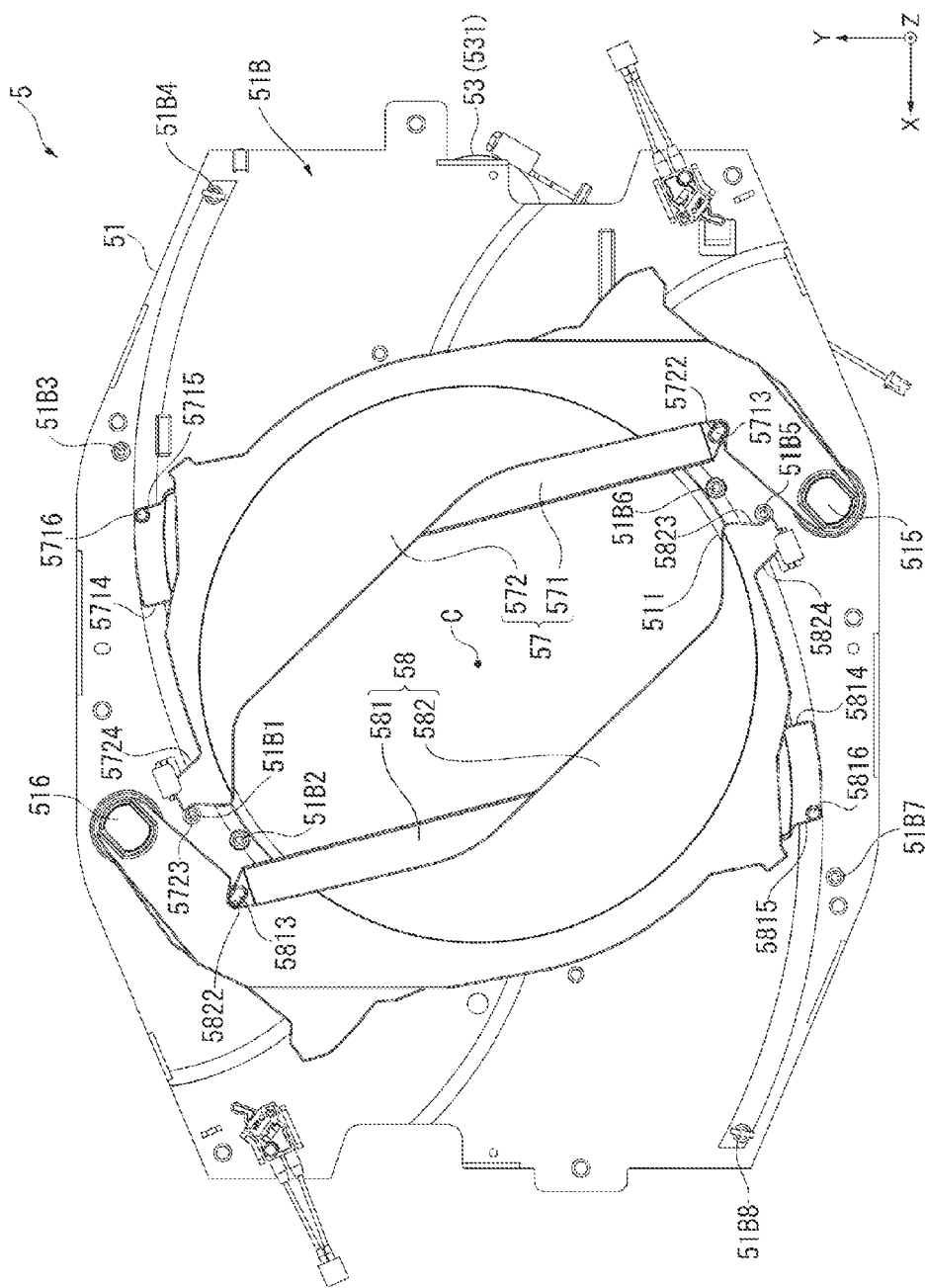
FIG. 10 is a diagram of the shutter device viewed from the light emission side in a state in which an outer blade in the embodiment reaches a closing position.

FIG. 10 is a diagram of the shutter device 5 viewed from the light emission side (the Z direction side) in a state in which the shield blades 57 and 58 turn in the closing direction from the opening positions shown in FIG. 7 and only the outer blades 572 and 582 reach the closing positions.

At this stage, the turning in the closing direction of the shield blades 57 and 58 is not regulated. Therefore, the transmission regulating sections 545 and 547 transmit the transmitted driving force to the blade driving sections 546 and 548 and turn the inner blades 571 and 581 in the closing direction. The outer blades 572 and 582 also turn in the closing direction according to the turning of the inner blades 571 and 581.

Consequently, as shown in FIG. 10, first, the outer blades 572 and 582 reach the closing positions where the outer blades 572 and 582 come into contact with the movement regulating sections 51B1 and 51B5.

When the driving force is further transmitted to the blade driving sections 546 and 548 in this state, in a state in which the outer blades 572 and 582 are located in the closing positions, the inner blades 571 and 581 further turn in the closing direction. As shown in FIG. 5, the inner blades 571 and 581 also reach closing positions where the inner blades 571 and 581 come into contact with the movement regulating sections 51B2 and 51B6. Consequently, the opening section 511 is closed.

In this state, when the motor 531 continues to be driven, as explained above, the first gear section 5451 idles, whereby the driving force is not transmitted to the blade driving section 546. The same applies to the transmission adjusting section 547. Therefore, a load is suppressed from being applied to the shield blades 57 and 58 and the driving section 53.

When the shield blades 57 and 58 are located in the closing positions, the protrusion 5716 of the inner blade 571 comes into contact with the second contact section 5724 of the outer blade 572 and the protrusion 5816 of the inner blade 581 comes into contact with the second contact section 5824 of the outer blade 582. Consequently, the outer blades 572 and 582 are suppressed from unintentionally turning in the opening direction.

The recesses 5712 and 5812 are respectively formed in the inner blades 571 and 581. When the shield blades 57 and 58 are located in the closing positions, the movement regulating sections 51B1 and 51B6 are respectively arranged in the recesses 5812 and 5712. Therefore, it is possible to bring, with the movement regulating sections 51B2 and 51B6 located near the end edge of the opening section 511, the inner blades 571 and 581 into contact with each other at ends on the sides approaching each other. It is possible to substantially completely close the opening section 511.

Figure 11:
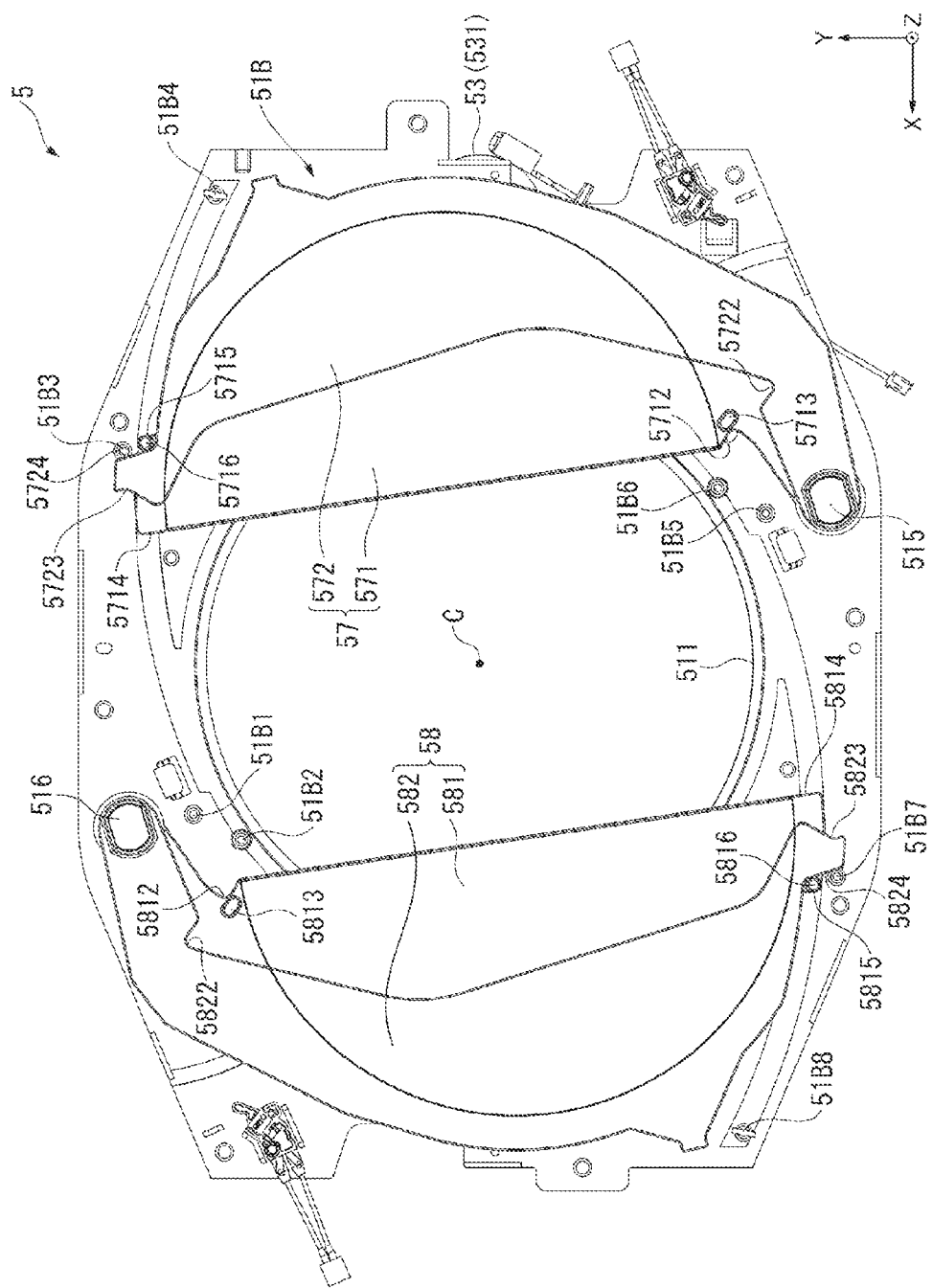
FIG. 11 is a diagram of the shutter device viewed from the light emission side in a state in which the outer blade in the embodiment reaches an opening position.

FIG. 11 is a diagram of the shutter device 5 viewed from the light emission side (the Z direction side) in a state in which the shield blades 57 and 58 are turned in the opening direction from the closing positions shown in FIG. 5 and only the outer blades 572 and 582 reach the opening positions.

On the other hand, in a state in which the opening section 511 is closed, when the gear 533 rotates in a direction for turning the shield blades 57 and 58 in the opening direction, as explained above, a driving force of the driving section 53 (a rotating force of the gear 533) is transmitted to the transmission adjusting sections 545 and 547 via the gears 541 to 543 and the ring gear 544.

At this stage, the turning in the opening direction of the shield blades 57 and 58 is not regulated. Therefore, the transmission adjusting sections 545 and 547 transmit the transmitted driving force to the blade driving sections 546 and 548 and turn the inner blades 571 and 581 in the opening direction. The outer blades 572 and 582 also turn in the closing direction according to the turning of the inner blades 571 and 581.

Consequently, as shown in FIG. 11, first, the outer blades 572 and 582 reach the closing positions where the outer blades 572 and 582 come into contact with the movement regulating sections 51B3 and 51B7.

When the driving force is transmitted to the blade driving sections 546 and 548 in this state, in a state in which the outer blades 572 and 582 are located in the opening positions, the inner blades 571 and 581 further turn in the opening direction. As shown in FIG. 7, the inner blades 571 and 581 also reach the opening positions where the inner blades 571 and 581 come into contact with the movement regulating sections 51B4 and 51B8. Consequently, the opening section 511 is opened.

When the motor 531 continues to be driven in this state, as explained above, the first gear section 5451 in the transmission adjusting section 545 idles, whereby the driving force is not transmitted to the blade driving section 546. The same applies to the transmission adjusting section 547. Therefore, a load is suppressed from being applied to the shield blades 57 and 58 and the driving section 53.

When the shield blades 57 and 58 are located in the opening positions, the protrusion 5713 of the inner blade 571 comes into contact with the recess 5722 of the outer blade 572 and the protrusion 5813 of the inner blade 581 comes into contact with the recess 5822 of the outer blade 582. Consequently, the outer blades 572 and 582 are suppressed from unintentionally turning in the closing direction.

The control device controls the driving section 53 on the basis of a detection result by a detecting section (not shown in the figure) configured to detect the positions of the shield blades 57 and 58. When the shield blades 57 and 58 respectively reach the opening positions, the control device stops the driving section 53. On the other hand, when the opening section 511 is closed, the control device controls the motor 531 to be driven for time enough for the shield blades 57 and 58 to reach the closing positions from the opening positions. However, the control by the control device is not limited to this. It is also possible that, when the opening section 511 is closed, the detecting section detects the positions of the shield blades 57 and 58 and the control device controls the driving section 53 on the basis of a detection result of the detecting section. On the other hand, it is also possible that the detecting section is not provided and the control device drives the driving section 53 to be driven for time enough for the shield blades 57 and 58 to reach the closing positions from the opening positions.

The shutter device 5 operates and the opening section 511 is opened and closed in this way. Consequently, the opening section 231 corresponding to the opening section 511 is opened and closed.

Configuration of the Supporting Member

Figure 12:
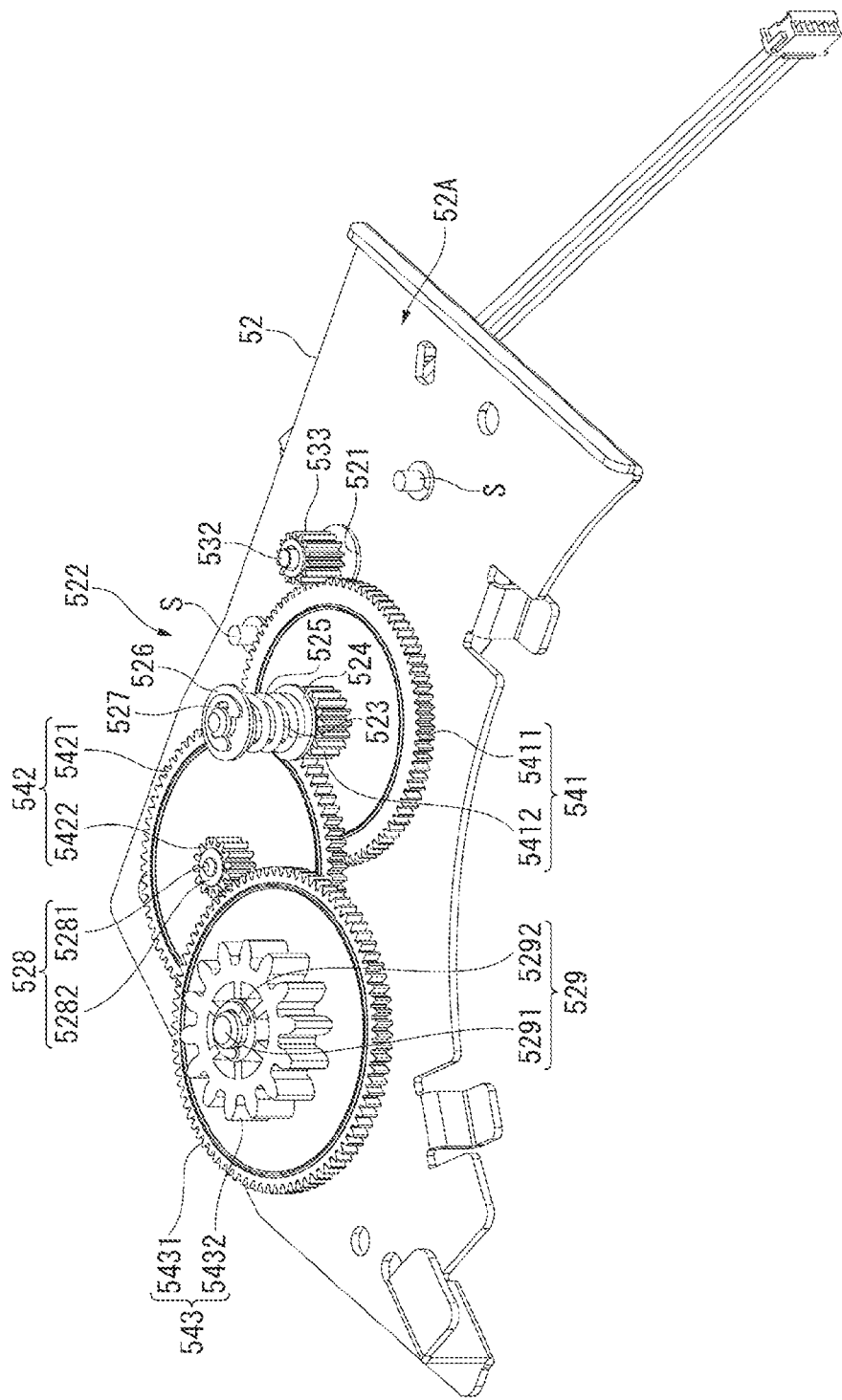
FIG. 12 is a perspective view showing a supporting member and a gear in the embodiment.
Figure 13:
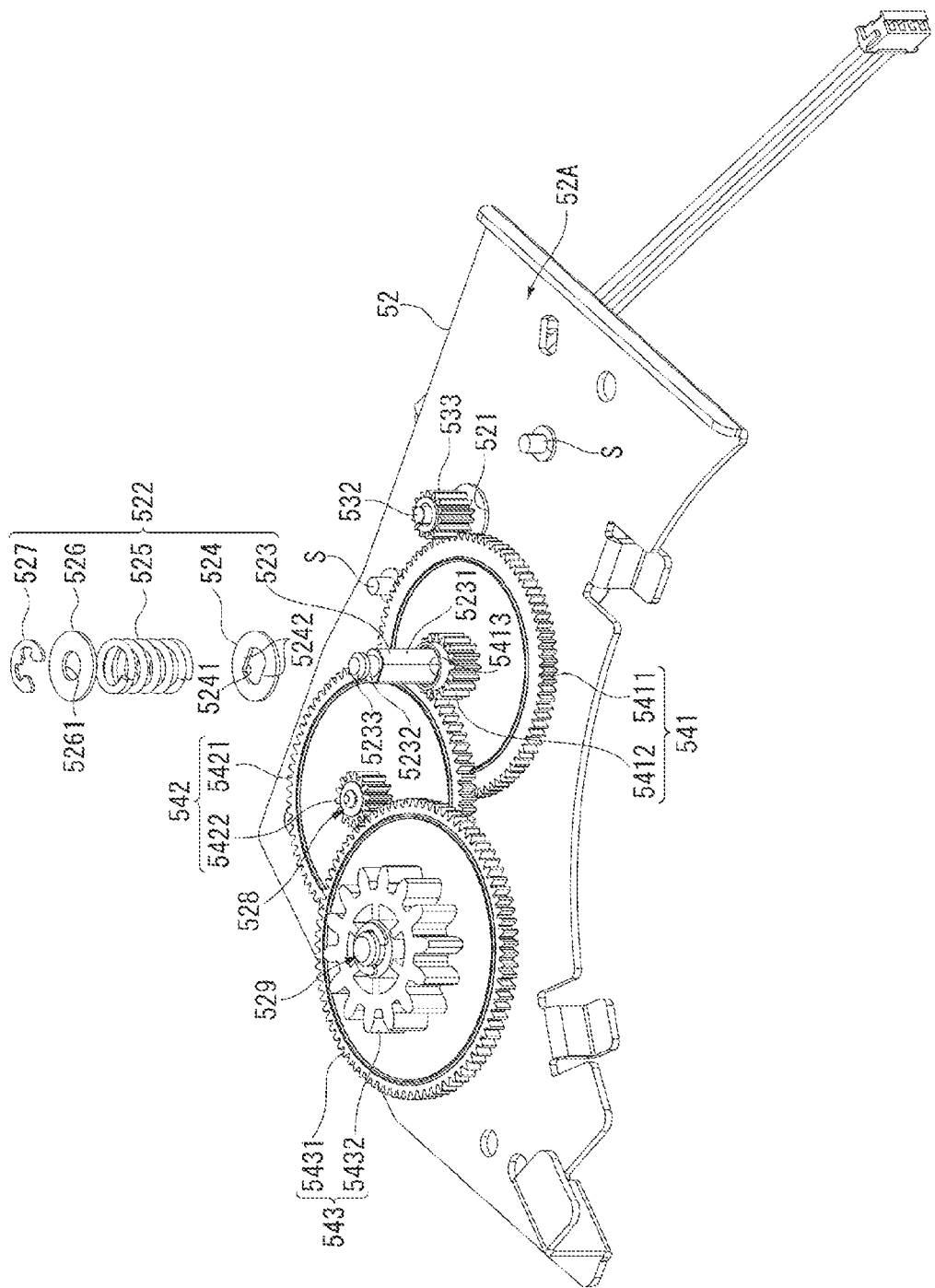
FIG. 13 is an exploded perspective view showing an attachment structure of the gear to the supporting member in the embodiment.

FIG. 12 is a perspective view showing the supporting member 52 and the gears 541 to 543. FIG. 13 is an exploded perspective view showing the gear supporting section 522.

The supporting member 52 is a metal member formed in a tabular shape. As shown in FIGS. 12 and 13, the supporting member 52 supports the driving section 53 and the gears 541 to 543 included in the transmitting section 54. The supporting member 52 is attached to the surface 51A of the chassis 51. In the supporting member 52, the rotating shaft 532 of the driving section 53 fixed by a screw S from a surface on the light incident side in the supporting member 52 and the hole section 521 through which the gear 533 is inserted are formed.

The supporting member 52 includes gear supporting sections 522, 528, and 529 configured to respectively rotatably support the gears 541 to 543.

Among the gear supporting sections 522, 528, and 529, the gear supporting section 528 includes a pin 5281 and a ring 5282. The pin 5281 is protrudingly provided on a surface 52A on the chassis 51 side in the supporting member 52. The ring 5282 is attached to an end of the pin 5281 inserted through the gear 542 and prevents the gear 542 from coming off the pin 5281.

Like the gear supporting section 528, the gear supporting section 529 includes a pin 5291 and a ring 5292. The ring 5292 is attached to an end of the pin 5291 inserted through the gear 543 and prevents the gear 542 from coming off the pin 5291.

The gear supporting section 522 is equivalent to the gear supporting section according to the invention configured to support the gear 541 functioning as a transmission gear. The gear supporting section 522 includes, as shown in FIG. 13, a pin 523 inserted through the gear 541 and an annular body 524, an urging member 525, a washer 526, and a locking member 527 attached to the pin 523 in order.

Figure 14:
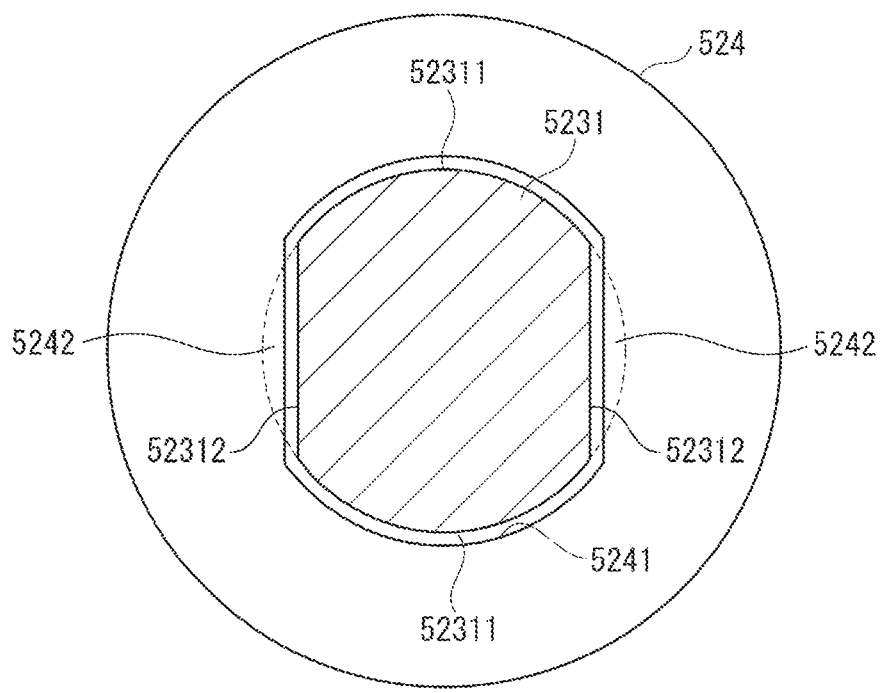
FIG. 14 is a sectional view showing a columnar section in the embodiment.

FIG. 14 is a sectional view of a columnar section 5231 in a direction orthogonal to a center axis of the pin 523.

The pin 523 is provided in the supporting member 52 and projects from the surface 52A. The pin 523 includes a columnar section 5231, a small-diameter section 5232, and a large-diameter section 5233.

In the columnar section 5231, the shape of a surface (a cross section) orthogonal to the center axis of the pin 523 in a part inserted through the gear 541 is a circular shape.

On the other hand, in the columnar section 5231, the shape of a surface orthogonal to the center axis in a part inserted through the annular body 524 and the urging member 525 is a shape obtained by cutting out both ends in the diameter direction in a circle (a perfect circle) as shown in FIG. 14. Specifically, the shape of the cross section in the columnar section 5231 includes a pair of arcuate sections 52311 forming parts of a circle and located on the opposite sides each other and a pair of linear sections 52312 that connect the pair of arcuate sections 52311.

The columnar section 5231 is inserted through a circular hole section 5413 (FIG. 13) formed in the gear 541 and enables the gear 541 to rotate along the pair of arcuate sections 52311. On the other hand, a rotation regulating section 5242 explained below of the annular body 524 comes into contact with the pair of linear sections 52312, whereby the turning of the annular body 524 with respect to the columnar section 5231 is regulated. That is, the linear sections 52312 function as the rotation regulating section according to the invention.

As shown in FIG. 13, the small-diameter section 5232 is located on the opposite side of the surface 52A side with respect to the columnar section 5231. The small-diameter section 5232 has an outer diameter smaller than the outer diameter of the columnar section 5231. The locking member 527 is attached to the small diameter section 5232.

The large-diameter section 5233 is located on the opposite side of the surface 52A side with respect to the small-diameter section 5232. The outer diameter of the large-diameter section 5233 is formed larger than the outer diameter of the small diameter section 5232.

The annular body 524 is formed like a washer. The columnar section 5231 is inserted through an insert-through hole 5241 formed in the center of the annular body 524. Therefore, the annular body 524 is located on the opposite side of the surface 52A with respect to the gear 541 (the distal end side of the pin 523). That is, the annular body 524 is an interposed member interposed between the gear 541 and the urging member 525.

As shown in FIG. 14, the insert-through hole 5241 included in the annular body 524 is formed in a shape corresponding to the circumferential edge shape of the columnar section 5231. That is, the annular body 524 includes a rotation regulating section 5242 formed in a part along the linear section 52312 in the columnar section 5231 and configured to regulate the rotation of the annular body 524 with respect to the columnar section 5231. Therefore, the rotation of the annular body 524 about the columnar section 5231 is regulated.

The urging member 525 is equivalent to the annular body urging member according to the invention. The columnar section 5231 is inserted through the urging member 525. The urging member 525 is located on the opposite side of the surface 52A side with respect to the annular body 524. In this embodiment, the urging member 525 is configured by a compression spring. The urging member 525 urges the annular body 524 to the surface 52A side.

The washer 526 is attached to a position corresponding to the small-diameter section 5232. That is, the washer 526 is located on the opposite side of the surface 52A side with respect to the urging member 525 and brought into contact with an end on the opposite side of the annular body 524 in the urging member 525. In the washer 526, a circular insert-through hole 5261, through which the large-diameter section 5233 and the small-diameter section 5232 are inserted, is formed.

The locking member 527 is attached to the small-diameter section 5232, prevents the annular body 524, the urging member 525, and the washer 526 from coming off the pin 523, and prevents the gear 541 from coming off. In this embodiment, the locking member 527 is configured by an E ring.

The gears 541 to 543 are configured to decelerate the rotation of the gear 533 and transmit the rotation to the ring gear 544. Therefore, among the gears 541 to 543, a gear having a largest number of revolutions per unit time is the gear 541 that meshes with the gear 533. Unless the gear 541 appropriately meshes with the gear 533, the rotation of the gear 533 cannot be transmitted to the other gears. Therefore, there is a request for a structure that rotatably supports the gear 541 and maintains a meshing state of the gear 541 and the gear 533.

However, a problem explained below occurs when, as a structure that urges the gear 541 to the surface 51A side and maintains the meshing state of the gear 541 and the gear 533, the gear supporting section 522 including a washer (hereinafter referred to as substitute washer) having a circular hole section, through which the columnar section 5231 is inserted, instead of the annular body 524 is adopted.

The substitute washer is rotatable with respect to the columnar section 5231. Therefore, it is likely that the substitute washer rotates together with the gear 541. When the substitute washer rotates, it is likely that the urging member 525 that urges the substitute washer also rotates. When the urging member 525 is configured by a coil spring, the coil spring comes into contact with a part of a surface of the substitute washer at the end of the coil spring rather than uniformly coming into contact with the surface of the substitute washer. Therefore, an urging force to the surface of the gear 541 opposed to the substitute washer is not uniform either. Therefore, the coil spring rotates when a condition of the rotation of the coil spring is satisfied rather than always rotating together with the rotation of the gear 541.

In such a configuration, in some case, a load of the motor 531 that rotates the gear 533, which meshes with the gear 541, changes between a state in which the coil spring is rotating and a state in which the coil spring is not rotating. Noise (humming sound), which is not normal driving sound of the motor 531, is emitted.

On the other hand, it is possible to fix the load of the motor 531 during driving and suppress emission of the noise by adopting the annular body 524 and preventing the rotation of the urging member 525 involved in the rotation of the gear 541 from occurring.

Effects of the Embodiment

With the projector 1 according to the embodiment explained above, effects explained below can be obtained.

The inner blade 571 and the outer blade 572 are arranged to overlap each other. The outer blade 572 turns in the same direction as the inner blade 571 according to the turning of the inner blade 571. Consequently, when the opening section 511 (and the opening section 231) is opened, the inner blade 571 and the outer blade 572 can be arranged to overlap each other on the outer side of the opening section 511. Therefore, since a retraction space for the inner blade 571 and the outer blade 572 can be reduced, it is possible to reduce the projector 1 in size. The same applies to the inner blade 581 and the outer blade 582.

The outer blade 572 is turned in the same direction as the inner blade 571 by frictional resistance with the inner blade 571 caused to overlap the outer blade 572. Consequently, it is unnecessary to provide, in the blades 571 and 572, structures that engage with each other. Further, even if manufacturing accuracy and combination accuracy of the blades 571 and 572 are relatively low, it is possible to turn the outer blade 572 according to the turning of the inner blade 571. Therefore, it is possible to simplify the configuration and the combination of the blades 571 and 572. Further, it is possible to easily manufacture the blades 571 and 572. The same applies to the inner blades 581 and the outer blade 582.

When the outer blade 572 moves to the closing position, the outer blade 572 and the movement regulating section 51B1 come into contact with each other. Consequently, the further turning of the outer blade 572 in the closing direction is regulated. In this state, it is possible to further move the inner blade 571 in the closing direction. Therefore, it is possible to separate the inner blade 571 and the outer blade 572. Therefore, it is possible to increase the region in the opening section 511 (and the opening section 231) closed by the blades 571 and 572. The same applies to the inner blade 581 and the outer blade 582.

When the inner blade 571 is turned in the opening direction in a state in which the inner blade 571 and the outer blade 572 are separated from each other, the inner blade 571 and the outer blade 572 overlap each other. Therefore, it is possible to surely move the outer blade 572 in the opening direction together with the inner blade 571. The same applies to the inner blade 581 and the outer blade 582.

Since the inner blade 571 is urged in the direction approaching the outer blade 572 by the urging member 5464, it is possible to surely bring the blades 571 and 572 into contact with each other. Therefore, it is possible to surely turn, with frictional resistance with the inner blade 571, the outer blade 572 in the same direction as the inner blade 571 according to the turning of the inner blade 571. The same applies to the inner blade 581 and the outer blade 582.

The transmission adjusting section 545 includes the first gear section 5451 and the second gear section 5452 configured as the separate bodies and coaxially arranged by the pin-like section 513 and the urging member 5455 configured to urge the first gear section 5451 to the second gear section 5452 side.

When the first gear section 5451 is turned by a driving force from the ring gear 544 in a state in which the turning of the inner blade 571 is not regulated and the second gear section 5452 is rotatable, it is possible to rotate the second gear section 5452 in the same direction as the first gear section 5451 with frictional resistance with the first gear section 5451. In this case, it is possible to surely bring the first gear section 5451 and the second gear section 5452 into contact with each other with the urging force of the urging member 5455. Therefore, it is possible to surely cause frictional resistance between the first gear section 5451 and the second gear section 5452. Therefore, it is possible to surely rotate the second gear section 5452 together with the first gear section 5451. It is possible to transmit a driving force from the second gear section 5452 to the blade driving section 546. Therefore, it is possible to surely turn the inner blade 571.

On the other hand, when the first gear section 5451 is rotated by the driving force from the ring gear 544 in a state in which the turning of the inner blade 571 is regulated and the second gear section 5452 cannot be rotated, the first gear section 5451 idles with respect to the second gear section 5452. Consequently, it is possible to suppress the driving force from being transmitted to the inner blade 571 via the second gear section 5452. It is possible to suppress a load from being applied to the inner blade 571 and the driving section 53. The same applies to the transmission adjusting section 547 including the same configuration as the transmission adjusting section 545.

The shutter device 5 includes the inner blade 571 and the outer blade 572 configured to open and close one region in the radial direction of the opening section 511 and the inner blade 581 and the outer blade 582 configured to open and close the other region. When the opening section 511 is opened and closed, the inner blade 571 and the outer blade 572 and the inner blade 581 and the outer blade 582 respectively turn in the directions approaching and separating from each other. Consequently, it is possible to reduce movement amounts of the blades 571, 572, 581, and 582. Therefore, it is possible to reduce time involved in the opening and closing of the opening section 511 (and the opening section 231). It is possible to quickly open and close the opening section 511.

The transmitting section 54 includes the ring gear 544 arranged along the end edge of the opening section 511 and configured to turn about the center position C. The inner blade 571 and the outer blade 572 are turned by the transmission adjusting section 545 including the first gear section 5451, which meshes with the ring gear 544, and the blade driving section 546. The inner blade 581 and the outer blade 582 are turned by the transmission adjusting section 547 and the blade driving section 548 including the same configurations as the transmission adjusting section 545 and the blade driving section 546. Consequently, it is possible to turn the inner blades 571 and 581 in synchronization with each other. Therefore, it is possible to smoothly carry out opening and closing of the opening section 511 (and the opening section 231) by the blades 571, 572, 581, and 582.

The columnar section 5231 of the pin 523 inserted through the gear 541 includes the arcuate section 52311 configured to enable the gear 541 to rotate. The annular body 524 pressed by the gear 541 includes the rotation regulating section 5242 arranged in the position corresponding to the linear section 52312 of the columnar section 5231 and configured to regulate the rotation of the annular body 524. Consequently, it is possible to regulate the urging member 525 from rotating together with the annular body 524. Therefore, it is possible to suppress noise from being emitted by the driving section 53.

It is possible to arrange, with the movement regulating sections 51B4 and 51B8, the inner blades 571 and 581 moving in the opening direction in the opening positions (the positions of the inner blades 571 and 581 where the inner blades 571 and 581 are located when the opening section 511 is opened). In this way, when the inner blades 571 and 581 move from the closing positions to the opening positions, the outer blades 572 and 582 move together with the inner blades 571 and 581. Therefore, it is also possible to locate the outer blades 572 and 582 in the opening positions, which are the positions on the outer side of the opening section 511. Therefore, it is possible to surely open the opening section 511.

Modifications

The invention is not limited to the embodiment. Modifications, improvements, and the like in a range in which the object of the invention can be attained are included in the invention.

In the embodiment, in the shutter device 5, the inner blades 571 and 581 and the outer blades 572 and 582 respectively turn in one direction and the other direction about the turning axis extending along the Z direction, which is the direction orthogonal to the chassis 51, to open and close the opening section 511 and the opening section 231. However, the invention is not limited to this. That is, the blade members may be linearly advanced and retracted to open and close the opening section 231. For example, the blade members advance and retract along the direction orthogonal to the Z direction to open and close the opening section 231. In this case, the plurality of blade members located on one end side of the opening section 231 advance and retract in the same direction to open and close the entire region of the opening section 231. Further, a plurality of blade members may be arranged on each of one end side and the other end side of the opening section 231. In this case, the plurality of blade members located on the one end side advance and retract to the other end side and the plurality of blade members located on the other end side advance and retract to the one end side to open and close substantially a half each of the opening section 231.

In the embodiment, the shutter device 5 includes the shield blade 57 including the inner blade 571 and the outer blade 572 and the shield blade 58 including the inner blade 581 and the outer blade 582. However, the invention is not limited to this. That is, the shutter device 5 may include only one of the shield blades 57 and 58. In this case, when the inner blade and the outer blade are located in the closing positions, the opening section 511 may be completely closed or a part of the opening section 511 may be closed. The number of blade members included in the shield blade is not limited to two and can be changed.

When the shield blades 57 and 58 reach the closing positions, a part of the inner blade 571 and a part of the inner blade 581 may overlap each other.

In the embodiment, the inner blade 571 is urged in the direction approaching the outer blade 572 by the urging member 5464. However, the invention is not limited to this. That is, the urging member 5464 may urge the outer blade 572 in the direction approaching the inner blade 571. The same applies to the blade driving section 548 having the same configuration as the blade driving section 546.

In the embodiment, the transmission adjusting section 545 configured to transmit the driving force from the ring gear 544 to the blade driving section 546 includes the first gear section 5451 and the second gear section 5452, which are coaxially rotatably supported, and the urging member 5455 configured to urge the first gear section 5451 in the direction approaching the second gear section 5452. The transmission adjusting section 547 includes the same configuration as the transmission adjusting section 545. However, the invention is not limited to the embodiment. That is, the configuration of the transmission adjusting sections 545 and 547 may be provided in other parts. For example, as a configuration for transmitting the driving force from the driving section 53 to the ring gear 544, the configuration of the transmission adjusting section may be provided.

In the embodiment, the urging member 5455 urges the first gear section 5451 toward the second gear section 5452. However, the invention is not limited to this. The urging member 5455 may urge the second gear section 5452 toward the first gear section 5451. The same applies to the transmission adjusting section 547.

In the embodiment, the transmitting section 54 includes the ring gear 544 arranged along the end edge of the opening section 511 and supported rotatably about the center position C. The transmission adjusting sections 545 and 547 configured to transmit the driving force to the blade driving sections 546 and 548 mesh with the ring gear 544. However, the invention is not limited to this. The ring gear 544 does not have to be provided as long as it is possible to transmit the driving force to the blade driving sections 546 and 548 and move the shield blades 57 and 58. The driving force may be transmitted by a belt or the like instead of the ring gear 544. An arcuate gear may be adopted rather than a completely circular gear. Further, a driving section and a transmitting section for moving the shield blade 57 and a driving section and a transmitting section for moving the shield blade 58 may be separately provided.

The transmitting section 54 decelerates and transmits the rotation of the gear 533 of the driving section 53 with the gears 541 and 543. However, the invention is not limited to this. The gears 541 to 543 do not have to be provided as long as it is possible to control the rotation of the gear 533.

In the embodiment, the gear supporting section 522 included in the supporting member 52 supports the gear 541 with which the gear 533 of the driving section 53 meshes. However, the invention is not limited to this. The configuration of the gear supporting section 522 may be adopted as a configuration for supporting the other gears such as the gears 542 and 543.

In the embodiment, the columnar section 5231 of the pin 523 includes the pair of arcuate sections 52311 and the pair of linear sections 52312 and the annular body 524 includes the insert-through hole 5241 and the rotation regulating section 5242 to regulate the rotation of the annular body 524 with respect to the pin 523. However, the invention is not limited to this. Other configurations may be adopted as long as it is possible to regulate the rotation of the annular body 524 with respect to the pin 523. For example, the linear sections 52312 and the rotation regulating sections 5242 do not need to be provided in pairs. The columnar section 5231 may include one linear section 52312 and the annular body 524 may include one rotation regulating section 5242 corresponding to the one linear section 52312. A groove extending along the center axis of the pin 523 may be formed on the circumferential surface of the pin 523. The annular body 524 may include a hole section through which the pin 523 is inserted and a projecting section inserted into the groove.

Further, in the embodiment, the sectional shape of the portion where the gear 541 is arranged in the columnar section 5231 is a circular shape and the sectional shape of the portion where the annular body is arranged is the shape including the linear section 52312. However, the invention is not limited to this. The entire columnar section 5231 extending along the center axis of the pin 523 may be formed in a sectional shape including the linear section 52312.

The external shape of the annular body 524 does not have to be the circular shape and may be other shapes such as a rectangular shape.

In the embodiment, the movement regulating sections 51B4 and 51B8 come into contact with the inner blades 571 and 581 turned to the opening positions to regulate the further turning in the opening direction of the inner blades 571 and 581. However, the invention is not limited to this. When the inner blades 571 and 581 and the outer blades 572 and 582 are arranged in the opening positions, the operation of the driving section 53 may be stopped. Further, a detecting section configured to detect the inner blades 571 and 581 and the outer blades 572 and 582 moving to at least one of the opening positions and the closing positions may be provided. The control device may control the operation of the driving section 53 on the basis of a detection result of the detecting section. When the opening section 511 is closed, if the inner blades 571 and 581 come into contact with each other at the ends on the sides approaching each other, the movement regulating sections 51B2 and 51B6 do not have to be provided.

In the embodiment, the urging member 525 functioning as the annular body urging member, the urging member 5455 functioning as the gear urging member, and the urging member 5464 functioning as the blade urging member are respectively the compression coils. However, the invention is not limited to this. The urging members 525, 5455, and 5464 may be other components as long as it is possible to cause an urging force to act on an urging target. For example, elastic members such as rubber may be adopted as the urging members.

In the embodiment, the projector 1 includes three liquid crystal panels 441 (441R, 441G, and 441B). However, the invention is not limited to this. The invention is also applicable to a projector including two or less or four or more liquid crystal panels.

In the embodiment, the transmissive liquid crystal panel 441 is used in which a light incident surface and a light emission surface are different. However, a reflective liquid crystal panel may be used in which a light incident surface and a light emission surface are the same.

Light modulating devices other than the liquid crystal such as a device including a micromirror, for example, a DMD (Digital Micromirror Device) may be used as long as the light modulating devices can modulate incident light and form an image corresponding to image information.

The entire disclosure of Japanese Patent Application No. 2013-133821, filed Jun. 26, 2013 is expressly incorporated by reference herein.

What is claimed is:

1. A projector comprising:
an armor housing including an opening section through which an image is transmitted and configured to form an armor; and
a shutter device configured to open and close the opening section, wherein
the shutter device includes:
a blade member;
a moving section configured to move the blade member in a closing direction in which the opening section is closed and an opening direction in which the opening section is opened; and
a movement regulating section configured to come into contact with the blade member and regulate the movement of the blade member,
the blade member includes a first blade and a second blade arranged to at least partially overlap each other and configured to move in a same direction as each other to close and open at least a part of the opening section,
when the first blade is moved by the moving section, the second blade is moved in a same direction as the first blade by frictional resistance with the first blade,
the movement regulating section includes a second-blade regulating section configured to come into contact with the second blade moved in the closing direction to a predetermined position and regulate further movement of the second blade in the closing direction,
the moving section includes a transmitting section configured to transmit a driving force for moving the first blade, and
the transmitting section includes:
a first gear section rotated by the transmitted driving force,
a second gear section configured separately from the first gear section, arranged coaxially with the first gear section, and rotated in the same direction as the first gear section by the frictional resistance with the first gear section, and
a gear urging member configured to urge the first gear section and the second gear section in directions in which the other approaches one of the first gear section and the second gear section.

2. The projector according to claim 1, further comprising a blade urging member configured to urge the first blade and the second blade in directions in which one of the first blade and the second blade approaches the other.

3. The projector according to claim 1, wherein
the blade member includes a third blade and a fourth blade arranged to at least partially overlap each other and configured to turn in the same direction as each other and close and open at least a part of the opening section,
when the third blade is moved by the moving section, the fourth blade is moved in a same direction as the third blade by frictional resistance with the third blade, the first blade and the second blade open and close one region in a radial direction of the opening section, the third blade and the fourth blade open and close the other region in the radial direction of the opening section, and the first blade and the second blade and the third blade and the forth blade respectively move in directions in which the blades approach each other when closing the opening section and separate from each other when opening the opening section.

4. The projector according to claim 3, wherein the moving section further includes:
   a ring gear having an inner diameter larger than the inner diameter of the opening section, arranged along an end edge of the opening section, and rotated by a driving force transmitted thereto;
   a first-blade driving section configured to engage with the ring gear and move the first blade with the driving force transmitted from the ring gear; and
   a third-blade driving section configured to engage with the ring gear and move the third blade with the driving force transmitted from the ring gear.

5. The projector according to claim 1, wherein the moving section further includes:
   a driving section configured to generate a driving force for moving the blade member;
   a transmission gear rotated by a driving force generated by the driving section and transmitted to the transmission gear and configured to transmit the driving force; and
   a gear supporting section configured to support the transmission gear, and
   the gear supporting section includes:
      a pin inserted through the transmission gear;
      an annular body through which the pin is inserted, the annular body being brought into contact with the transmission gear; and
      an annular-body urging member attached to the pin and configured to come into contact with the annular body and urge the annular body to the transmission gear side, and
   at least any one of the pin and the annular body includes a rotation regulating section configured to regulate the annular body from rotating together with the transmission gear.

6. The projector according to claim 1, wherein the movement regulating section includes a first-blade regulating section configured to come into contact with the first blade that moves at least partially to the outer side of the opening section, and regulate the further movement of the first blade in the opening direction.

7. A projector comprising:
   an armor housing including an opening section through which an image is transmitted and configured to form an armor; and
   a shutter device configured to open and close the opening section, wherein
   the shutter device includes:
      a blade member,
      a moving section configured to move the blade member in a closing direction in which the opening section is closed and an opening direction in which the opening section is opened, and
      a movement regulating section configured to come into contact with the blade member and regulate the movement of the blade member,
   the blade member includes:
      a first blade and a second blade arranged to at least partially overlap each other and configured to move in a same direction as each other to close and open at least a part of the opening section, and
      a third blade and a fourth blade arranged to at least partially overlap each other and configured to turn in a same direction as each other and close and open at least a part of the opening section,
   when the first blade is moved by the moving section, the second blade is moved in a same direction as the first blade by frictional resistance with the first blade,
   when the third blade is moved by the moving section, the fourth blade is moved in a same direction as the third blade by frictional resistance with the third blade,
   the movement regulating section includes a second-blade regulating section configured to come into contact with the second blade moved in the closing direction to a predetermined position and regulate further movement of the second blade in the closing direction,
   the first blade and the second blade open and close one region in a radial direction of the opening section,
   the third blade and the fourth blade open and close the other region in the radial direction of the opening section,
   the first blade and the second blade and the third blade and the forth blade respectively move in directions in which the blades approach each other when closing the opening section and separate from each other when opening the opening section, and
   the moving section includes:
      a ring gear having an inner diameter larger than the inner diameter of the opening section, arranged along an end edge of the opening section, and rotated by a driving force transmitted thereto;
      a first-blade driving section configured to engage with the ring gear and move the first blade with the driving force transmitted from the ring gear; and
      a third-blade driving section configured to engage with the ring gear and move the third blade with the driving force transmitted from the ring gear.

8. A projector comprising:
   an armor housing including an opening section through which an image is transmitted and configured to form an armor; and
   a shutter device configured to open and close the opening section, wherein
   the shutter device includes:
      a blade member,
      a moving section configured to move the blade member in a closing direction in which the opening section is closed and an opening direction in which the opening section is opened, and
      a movement regulating section configured to come into contact with the blade member and regulate the movement of the blade member,
   the blade member includes a first blade and a second blade arranged to at least partially overlap each other and configured to move in a same direction as each other to close and open at least a part of the opening section,
   when the first blade is moved by the moving section, the second blade is moved in a same direction as the first blade by frictional resistance with the first blade, and
   the movement regulating section includes a second-blade regulating section configured to come into contact with the second blade moved in the closing direction to a predetermined position and regulate further movement of the second blade in the closing direction,
   the moving section includes:

a driving section configured to generate a driving force for moving the blade member, a transmission gear rotated by a driving force generated by the driving section and transmitted to the transmission gear and configured to transmit the driving force, and a gear supporting section configured to support the transmission gear, and the gear supporting section includes:

a pin inserted through the transmission gear, an annular body through which the pin is inserted, the annular body being brought into contact with the transmission gear, and an annular-body urging member attached to the pin and configured to come into contact with the annular body and urge the annular body to the transmission gear side, and at least any one of the pin and the annular body includes a rotation regulating section configured to regulate the annular body from rotating together with the transmission gear.

* * * * *